(12) United States Patent
Fischer et al.

(10) Patent No.: US 9,297,495 B2
(45) Date of Patent: Mar. 29, 2016

(54) HOLDING DEVICE FOR A FLAT ITEM

(75) Inventors: Christopher E. Fischer, Boulder, CO (US); Ho-Tsang Li, Tainan (TW)

(73) Assignee: Boomerang Enterprises, Inc., Boulder, CO (US)

( * ) Notice: Subject to any disclaimer, the term of this patent is extended or adjusted under 35 U.S.C. 154(b) by 52 days.

(21) Appl. No.: 13/194,690

(22) Filed: Jul. 29, 2011

(65) Prior Publication Data

US 2013/0026324 A1    Jan. 31, 2013

(51) Int. Cl.
| | |
|---|---|
| *F16M 13/02* | (2006.01) |
| *F16M 11/14* | (2006.01) |
| *F16M 11/04* | (2006.01) |
| *F16M 13/00* | (2006.01) |
| *F16B 45/00* | (2006.01) |
| *F16B 2/08* | (2006.01) |

(52) U.S. Cl.
CPC ............. *F16M 11/14* (2013.01); *F16M 11/041* (2013.01); *F16M 13/00* (2013.01); *F16M 13/022* (2013.01); *F16B 2/08* (2013.01); *F16B 45/00* (2013.01)

(58) Field of Classification Search
CPC ..... F16M 11/14; F16M 11/041; F16M 13/00; F16M 13/022; F16B 2/08; F16B 45/00
USPC ............. 248/454, 551, 451, 441.1, 447, 448, 248/455, 328, 442, 456, 457, 452, 453, 248/304–306, 469, 460, 493, 462, 122.1, 248/689, 690–693, 488, 490, 491, 468, 248/917–924; 211/42, 43, 184; 361/679.57, 361/679.58, 679.59
See application file for complete search history.

(56) References Cited

U.S. PATENT DOCUMENTS

|  |  |  |  |  |
|---|---|---|---|---|
| 161,026 | A | * | 3/1875 | Brummon ...................... 248/457 |
| 261,740 | A | * | 7/1882 | Marucheau ................... 248/490 |
| 370,765 | A | * | 10/1887 | Campbell ...................... 248/495 |
| 969,195 | A | * | 9/1910 | Rothstein ....................... 248/493 |
| 1,873,178 | A | * | 8/1932 | Bernstein .......................... 40/603 |
| 2,300,972 | A | * | 11/1942 | Robinson ....................... 248/491 |
| 2,539,997 | A | * | 1/1951 | Graves ............................ 224/322 |
| 2,632,971 | A | * | 3/1953 | Cashman Manczek et al. ................................ 40/741 |
| 2,661,560 | A | * | 12/1953 | Malby ............................... 40/790 |
| 2,810,226 | A | * | 10/1957 | Horwitt ............................ 40/740 |
| 2,862,552 | A | * | 12/1958 | Franz ............................ 160/368.1 |
| 2,992,464 | A | * | 7/1961 | Muhlemann ................... 248/451 |

(Continued)

OTHER PUBLICATIONS

TheGigEasy. Professional Mounting Solutions for iPad & iPad 2. Downloaded at http://www.thegigeasy.com/index.html on Oct. 24, 2011.

*Primary Examiner* — Nkeisha Smith
(74) *Attorney, Agent, or Firm* — Holland & Hart LLP

(57) ABSTRACT

A holding device including a hub and a plurality of grappling assemblies attached thereto. Each grappling assembly includes a tension member and a hook connected to the tension member. The hook is adapted to engage an edge of the item. The hook includes a body portion and a pair of arms extending therefrom. The body portion includes a cavity with first and second open ends. The tension member extends into the first open end and a jaw fitting extends into the second open end, wherein the jaw fitting is operative to grasp the tension member. The tension member extends around a thimble that is attached to the hub. The thimble may comprise an arcuate channel extending around an aperture formed through the thimble. The thimble may be rotatably attached to the hub with a fastener extending through the hub and the aperture.

10 Claims, 27 Drawing Sheets

(56) References Cited

U.S. PATENT DOCUMENTS

| | | | | |
|---|---|---|---|---|
| 3,225,403 A | * | 12/1965 | Smith | 24/129 B |
| 3,328,033 A | * | 6/1967 | Hendry | 473/184 |
| 4,106,742 A | * | 8/1978 | Miller et al. | 248/488 |
| 4,473,207 A | * | 9/1984 | Nascher | 248/490 |
| 4,542,875 A | * | 9/1985 | DeBaun et al. | 248/491 |
| 4,614,322 A | * | 9/1986 | Goetz | 248/490 |
| 5,090,143 A | * | 2/1992 | Schier et al. | 40/790 |
| 5,362,025 A | * | 11/1994 | Trom et al. | 248/670 |
| 5,607,091 A | | 3/1997 | Musacchia | 224/222 |
| 5,725,189 A | * | 3/1998 | Landy | 248/205.2 |
| 5,769,369 A | * | 6/1998 | Meinel | 248/176.1 |
| 6,007,041 A | * | 12/1999 | Law | 248/491 |
| 6,119,993 A | | 9/2000 | Youngblood et al. | 248/231.9 |
| 6,123,309 A | | 9/2000 | Sage | 248/316.1 |
| 6,305,653 B1 | | 10/2001 | Oldham et al. | 248/177.1 |
| 6,332,284 B1 | * | 12/2001 | Tafforeau | 40/603 |
| 6,464,555 B1 | * | 10/2002 | Paduano | 446/227 |
| 6,513,780 B1 | | 2/2003 | Cox et al. | 248/490 |
| 6,578,394 B2 | | 6/2003 | Yin | 70/58 |
| 6,866,940 B1 | | 3/2005 | Laughlin | 428/542.2 |
| 7,185,861 B2 | | 3/2007 | LaMotte | 248/165 |
| 7,515,709 B2 | * | 4/2009 | Richter | 379/446 |
| 7,523,910 B2 | | 4/2009 | Moran | 248/317 |
| 7,600,728 B2 | * | 10/2009 | Petrick et al. | 248/286.1 |
| 7,922,137 B2 | * | 4/2011 | Derry et al. | 248/274.1 |
| 7,959,120 B2 | | 6/2011 | Liao | 248/278.1 |
| 7,966,757 B2 | | 6/2011 | Hyung-Chul | 40/603 |
| 7,984,886 B2 | | 7/2011 | Lin | 248/181.1 |
| 8,066,241 B2 | * | 11/2011 | Yu et al. | 248/286.1 |
| 8,235,334 B1 | | 8/2012 | Kobal | 248/122.1 |
| 8,240,628 B2 | * | 8/2012 | Huang | 248/316.1 |
| 8,294,014 B2 | | 10/2012 | Voorhees | 84/453 |
| 8,342,470 B2 | | 1/2013 | Shortell | 248/329 |
| 8,408,513 B2 | * | 4/2013 | Smith | 248/682 |
| 8,413,943 B1 | * | 4/2013 | Li | 248/454 |
| 8,424,825 B2 | * | 4/2013 | Somuah | 248/316.4 |
| 8,469,325 B2 | * | 6/2013 | Yu | 248/316.1 |
| 8,505,790 B2 | * | 8/2013 | Yu et al. | 224/185 |
| 8,636,257 B2 | | 1/2014 | Tsuo et al. | |
| 8,674,205 B2 | | 3/2014 | Voorhees | |
| 8,800,942 B2 | | 8/2014 | Yu | |
| 2005/0205730 A1 | * | 9/2005 | Carnevali | 248/163.1 |
| 2008/0070641 A1 | * | 3/2008 | Wang | 455/569.1 |
| 2008/0100996 A1 | * | 5/2008 | Wang | 361/681 |
| 2009/0095854 A1 | * | 4/2009 | Forbes et al. | 248/176.3 |
| 2009/0219677 A1 | * | 9/2009 | Mori et al. | 361/679.03 |
| 2010/0102197 A1 | * | 4/2010 | McIntyre | 248/687 |
| 2010/0154860 A1 | * | 6/2010 | Fereday | 136/245 |
| 2010/0219303 A1 | * | 9/2010 | Matsui et al. | 248/122.1 |
| 2010/0294908 A1 | | 11/2010 | Mish et al. | 248/451 |
| 2011/0240830 A1 | * | 10/2011 | Alemozafar et al. | 248/689 |
| 2011/0283863 A1 | * | 11/2011 | Dunlop | 84/329 |
| 2011/0303709 A1 | * | 12/2011 | Wizikowski | 224/218 |
| 2012/0024917 A1 | * | 2/2012 | Case et al. | 224/259 |
| 2012/0074272 A1 | * | 3/2012 | Hull | 248/122.1 |
| 2012/0097831 A1 | * | 4/2012 | Olukotun et al. | 248/688 |
| 2012/0175474 A1 | * | 7/2012 | Barnard et al. | 248/122.1 |
| 2012/0217371 A1 | * | 8/2012 | Abdollahzadeh et al. | 248/551 |
| 2012/0241567 A1 | * | 9/2012 | Gillespie-Brown et al. | 248/122.1 |
| 2012/0246879 A1 | * | 10/2012 | Pestal et al. | 24/3.2 |
| 2012/0318937 A1 | * | 12/2012 | Carnevali | 248/122.1 |
| 2013/0009032 A1 | * | 1/2013 | Polletta et al. | 248/440.1 |
| 2013/0043369 A1 | * | 2/2013 | Wheeler | 248/551 |
| 2013/0087666 A1 | * | 4/2013 | Chien et al. | 248/122.1 |
| 2013/0105662 A1 | * | 5/2013 | Cote | 248/689 |
| 2013/0134267 A1 | * | 5/2013 | Liu | 248/122.1 |
| 2013/0134284 A1 | * | 5/2013 | Hu et al. | 248/451 |
| 2013/0168527 A1 | * | 7/2013 | Wheeler et al. | 248/542 |

* cited by examiner

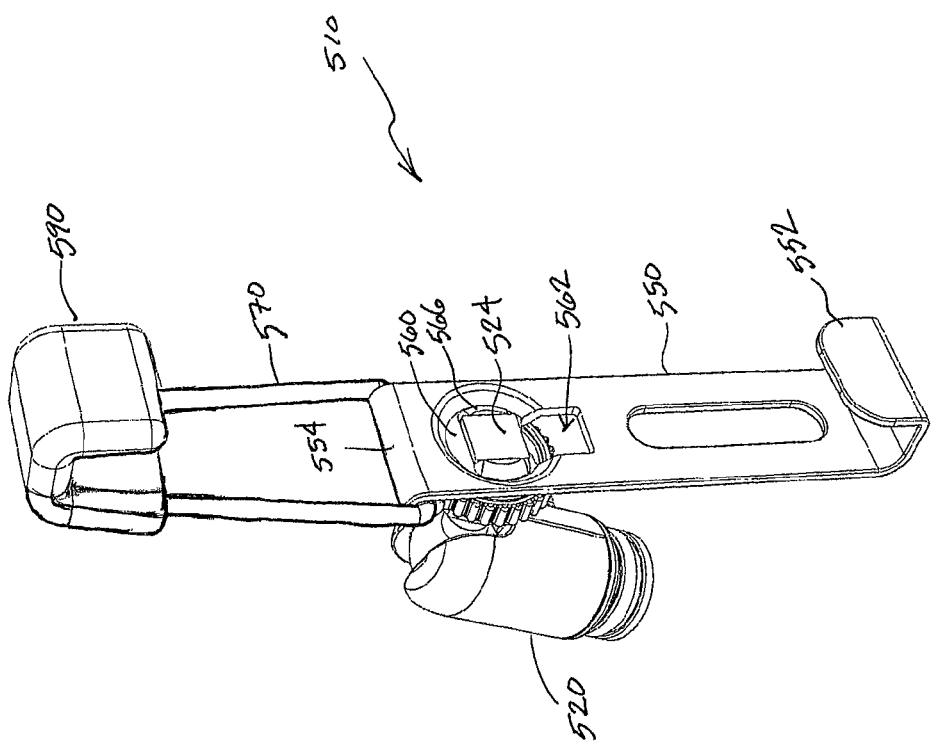

HOLDING DEVICE FOR A FLAT ITEM

BACKGROUND

Musicians have begun to move away from traditional bulky scores and books for their charts and music in favor of electronic tablet devices, such as the iPad or Kindle. There are an estimated one million working musicians in the world when one considers all of the church musicians, symphonic players, studio musicians, and live performing players. Tablet shaped computing devices are a convenient replacement for the many books of charts, scores, set lists, lyrics, etc. that a musician needs to access during a performance or practice session.

There exists a number of microphone stand attachment devices geared toward tablet devices, such as the iPad. While these devices have their place, there is room for improvement. Specifically there is room for improvement in versatility, modularity, compactness, convenience, and ease of manipulation.

Many of the existing devices only work for a particular tablet device, such as the iPad. Furthermore, the devices often require that the tablet be removed from its protective case. Thus, there is a need for a holding device that is versatile enough to work with different tablet devices as well as various protective covers and skins.

Existing devices are manufactured out of stiff plastic that is bulky. This bulky construction defeats the appeal of compact tablet devices. Moreover, these existing devices are often completely rigid and therefore take up space even when not attached to the device. Accordingly, there is a further need for a low profile holding device that is collapsible.

Also, many of the existing devices only allow a user to angle the tablet up or down and do not provide rotation adjustment such that the tablet device can be oriented between landscape and portrait orientations. Accordingly, there is a need for a low profile, versatile, and collapsible holding device that allows for multiple modes of adjustment.

SUMMARY

Described herein are various exemplary embodiments of a holding device for grasping flat items such as a tablet shaped computing device. The holding device includes a hub and a plurality of grappling assemblies attached thereto. The hub has a front side for confronting the item and an opposite back side. Each grappling assembly includes a tension member and a hook connected to the tension member. The hook is adapted to engage an edge of the item. The tension member may comprise a resilient material, such as elastic cord. The hook includes a body portion and a pair of arms extending therefrom. Each arm extends laterally from the body portion and may be joined together with an arcuate bridge portion. In an embodiment, each arm includes a right angle bend.

The holding device may further comprise a bracket removably engaged with the hub. The holding device may further comprise a resilient pad disposed on the front side of the hub and a resilient pad disposed on each of the hook body portions.

In an embodiment, the body portion of the hook includes a cavity with first and second open ends, the tension member extends into the first open end and a jaw fitting extends into the second open end, wherein the jaw fitting is operative to grasp the tension member. The tension member may include first and second end portions that extend into the first open end and wherein the jaw fitting is operative to grasp both the first and second end portions. In an embodiment, the jaw fitting includes a pair of tangs each including at least one tooth for engaging the tension member.

In an embodiment, the tension member extends around a thimble that is attached to the hub. The thimble may comprise an arcuate channel extending around an aperture formed through the thimble. The thimble may be rotatably attached to the hub with a fastener extending through the hub and the aperture.

In another embodiment, the holding device includes a hub having a front side for confronting a flat item and an opposite back side. A plurality of elongate tension members are rotatably attached to the back side of the hub, wherein each tension member has first and second end portions. The tension member extends around a fastener attached to the hub. The holding device also includes a hook adapted to engage an edge of the item; the hook includes a body portion and a pair of arms extending laterally therefrom. The body portion includes a cavity with first and second open ends, the first and second end portions extending into the first open end and a jaw fitting extends into the second open end. The jaw fitting is operative to grasp the first and second end portions of the tension member.

The foregoing and other features, utilities, and advantages of the holding device will be apparent from the following more particular description of the exemplary embodiments as illustrated in the accompanying drawings.

BRIEF DESCRIPTION OF THE DRAWINGS

The accompanying drawings, which are incorporated in and constitute a part of this specification, illustrate embodiments of a holding device and together with the description, serve to explain the principles and operation thereof. Like items in the drawings are generally referred to using the same numerical reference.

FIG. 27 is a perspective view of the holding device shown in FIG. 26 as viewed from the front of the holding device.

DETAILED DESCRIPTION

Described herein is a holding device that holds a flat item and allows a user to angle the item up or down and provides rotation adjustment such that the item can be oriented between landscape and portrait orientations. Furthermore, the disclosed holding device is a low profile, versatile, and collapsible device that allows for multiple modes of adjustment and use with various sizes and shapes of flat items.

Figure 1:
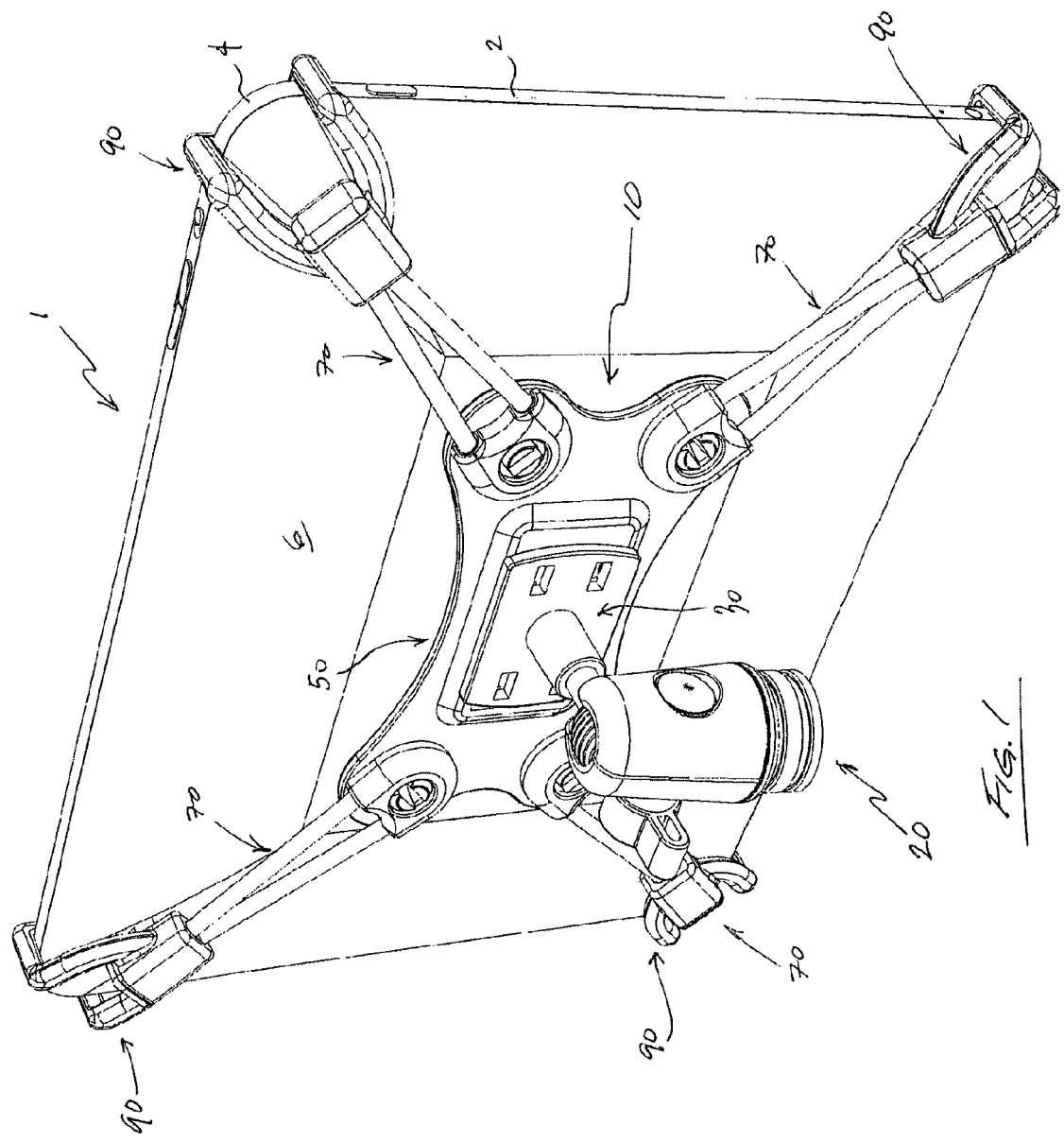
FIG. 1 is a perspective view of a first exemplary embodiment of a holding device that is grasping a flat item as viewed from the back of the holding device.

Holding device 10 is operative to grasp a flat item 1 such as a tablet computing device, as shown in FIG. 1. While the holding device is described herein with respect to a tablet computer, the holding device may be used with any flat form factor item. Other flat items that may be grasped by the holding device are, for example and without limitation, pictures, books, flat screen televisions, signs, display items, and the like. Item 1 includes four corners 4 and surrounding edges 2. Holding device 10 confronts item 1 from its backside 6 and grasps the corners 4 with hooks 90. While the exemplary embodiments show the flat item being grasped at the corners, the holding device may also grasp an item by its edges. Furthermore, the holding device may grasp round, obround, or irregularly shaped items as well. Holding device 10 may be attached to a microphone, or music stand adapter 20 via adapter bracket 30 which is designed to engage holding device 10 as well as provide a mounting point for attachments such as the microphone stand adapter 20. The holding device is described as being attached to a stand, such as a microphone stand; however, the holding device may be attached to other items including, for example and without limitation, a tripod, music stand, wall, windshield, window, table, or desk, to name a few.

Figure 2:
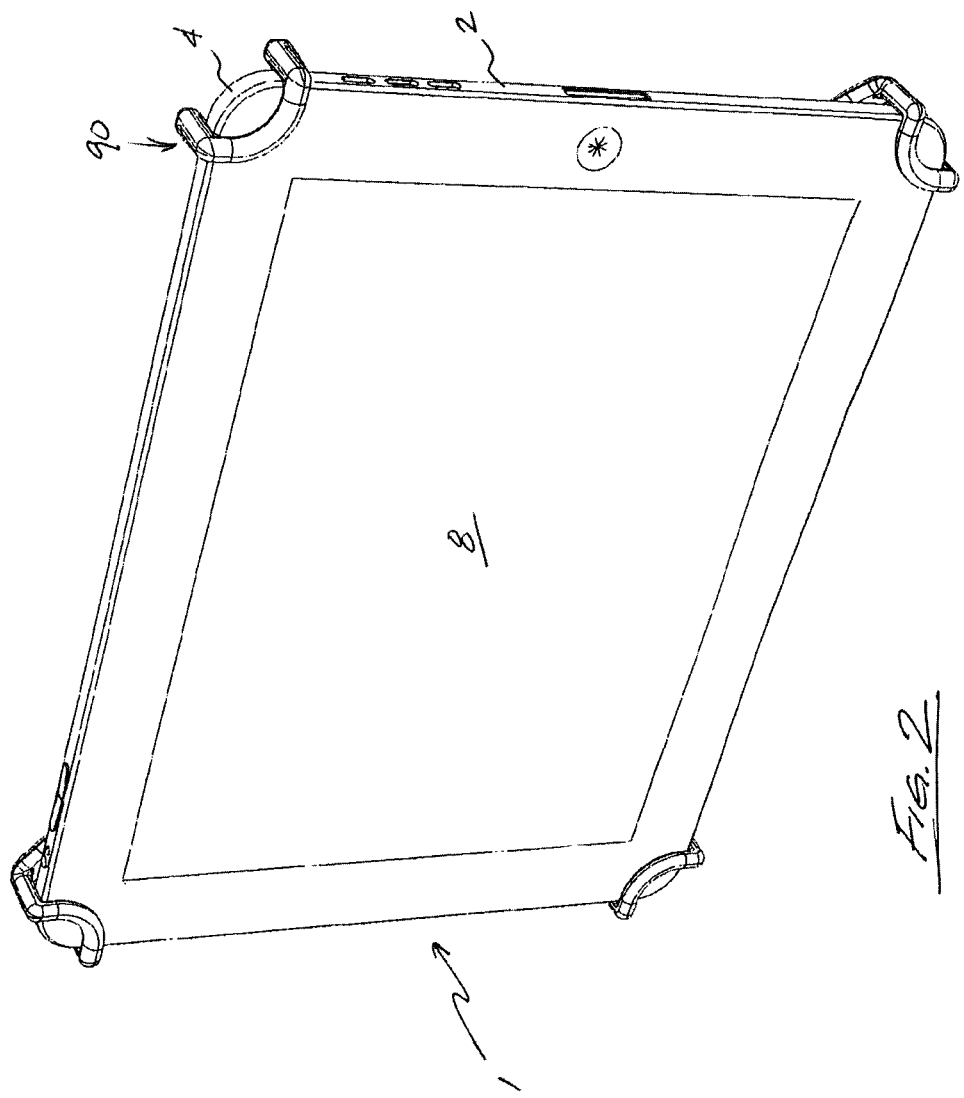
FIG. 2 is a perspective view of the holding device shown in FIG. 1 as viewed from the front of the holding device grasping a flat item.
Figure 3:
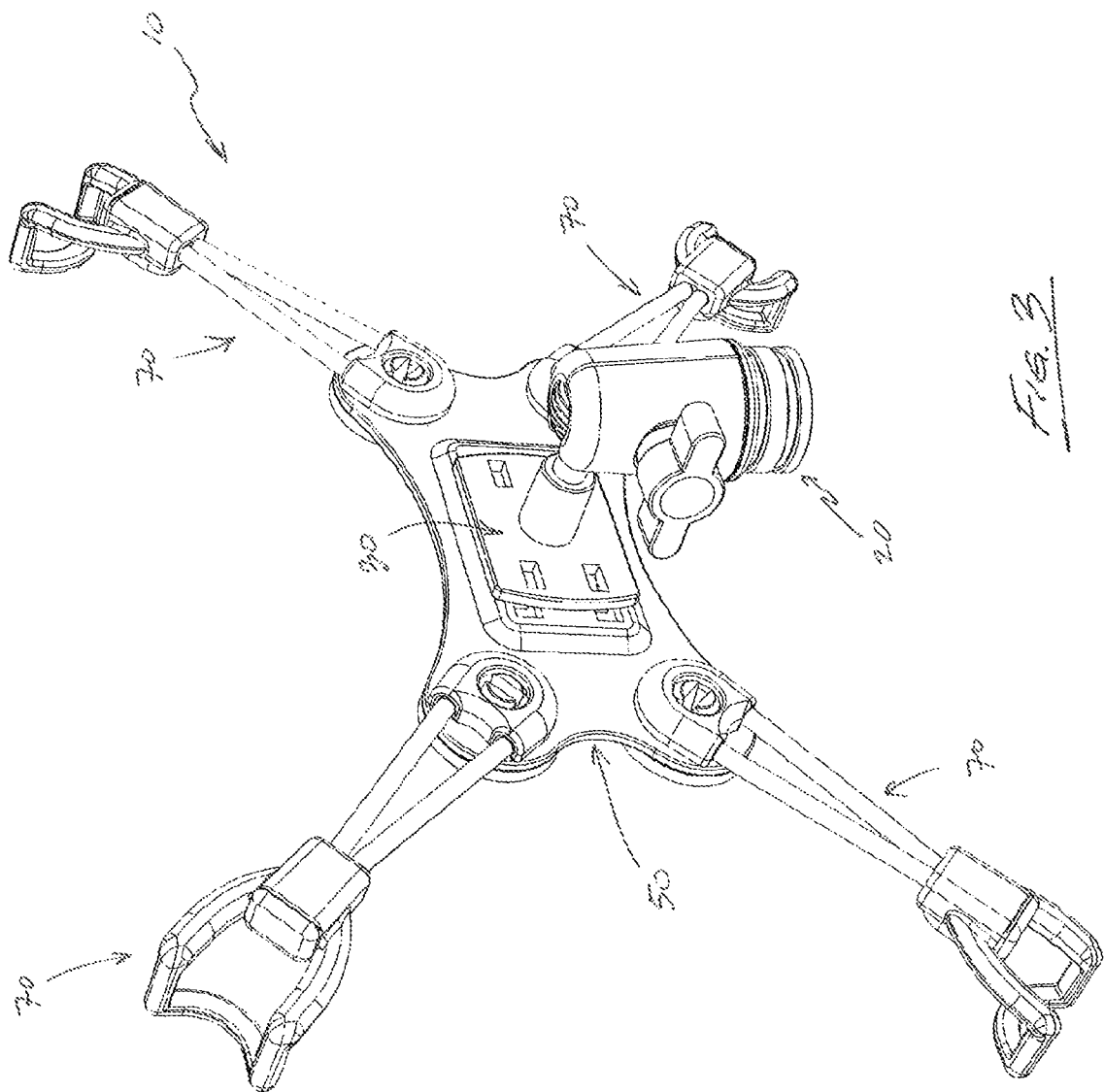
FIG. 3 is a perspective view of the holding device as viewed from the back.
Figure 4:
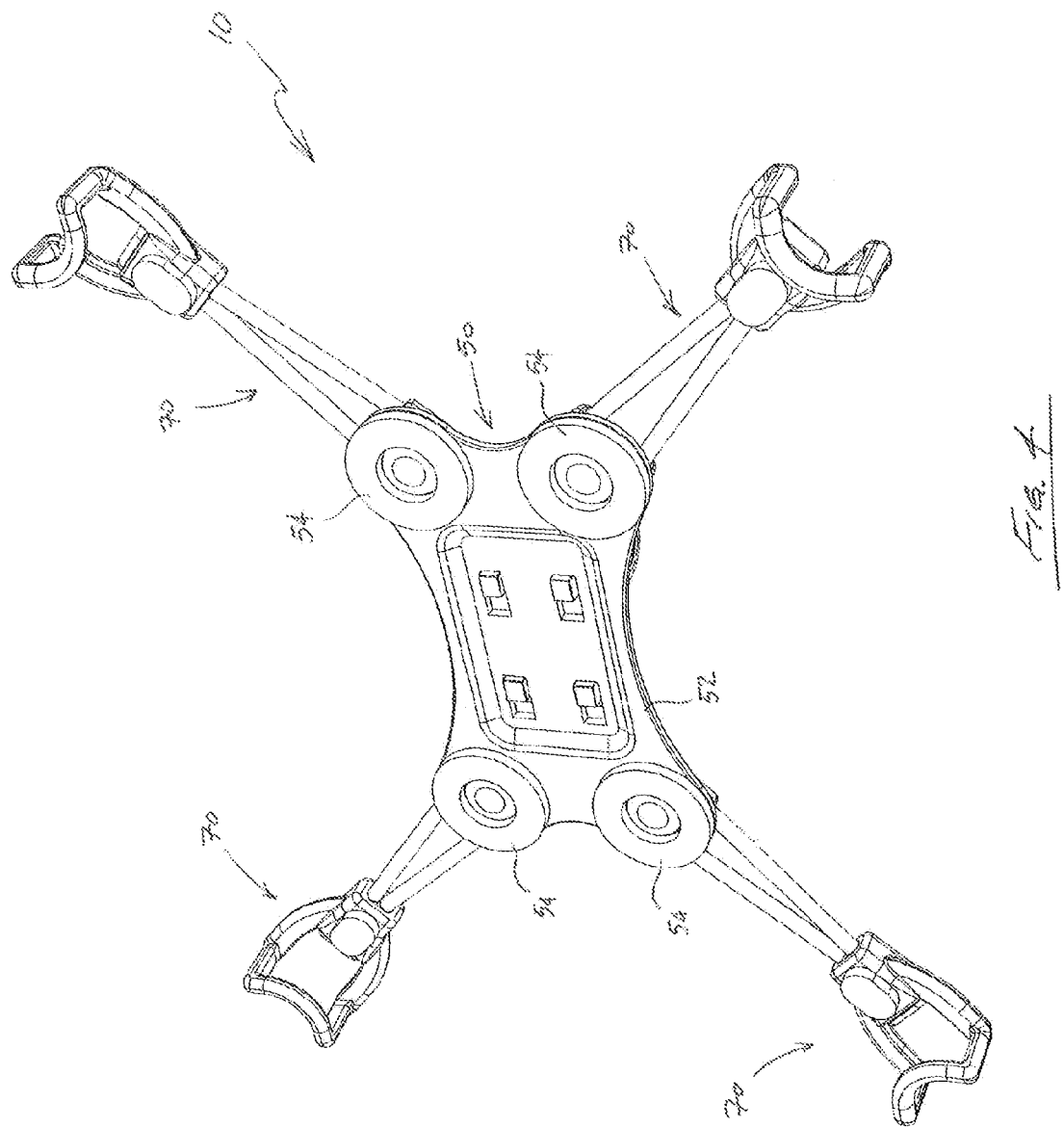
FIG. 4 is a perspective view of the holding device as viewed from the front.

Holding device 10 includes a hub assembly 50 from which a plurality of grappling assemblies 70 extend. The grappling assemblies 70 extend from the hub assembly 50 and terminate with hooks 90 which are adapted to grasp the edge and/or corners of an item. While four grappling assemblies are shown in the figures, more or fewer grappling assemblies may also be used. As shown in FIG. 2, the hooks 90 extend around edge 2, in this case, at corners 4. As shown in FIGS. 3 and 4, hub assembly 50 includes a hub plate 52 and a plurality of resilient pads 54. Resilient pads 54 confront the backside 6 of item 1 to prevent damage or marks thereon. Pads 54 may be comprised of, for example and without limitation, foam, rubber, felt, or the like. Pads 54 may be adhered to the hub plate with glue or adhesive tape, for example.

Figure 5:
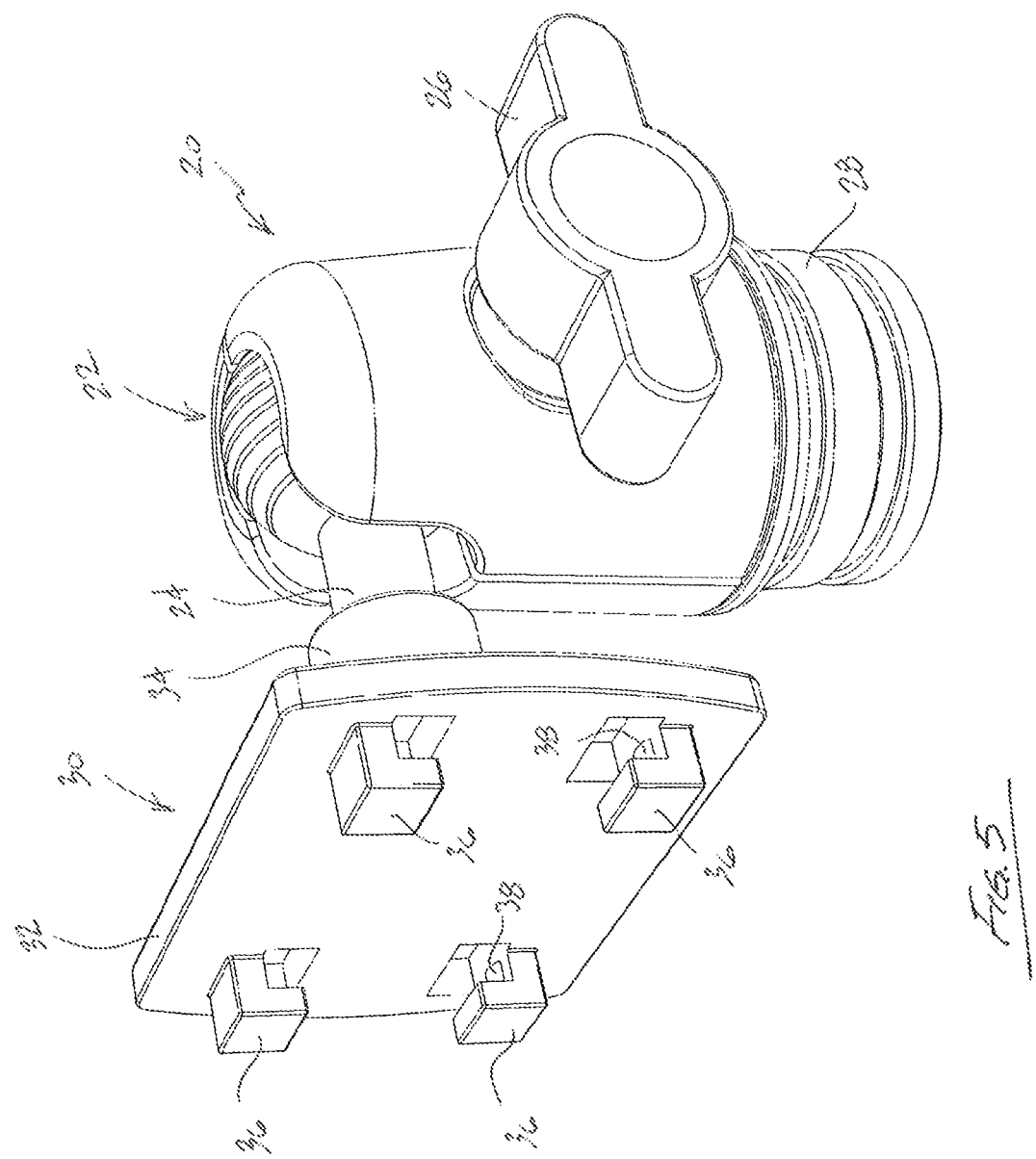
FIG. 5 is a perspective view of the holding device adapter bracket and an associated stand mount.

With continuing reference to FIG. 5, in this embodiment, the adapter bracket 30 includes a bracket base 32 from which extend a plurality of prongs 36 for engaging corresponding apertures in hub plate 52. Each prong 36 includes a protuberance 38 which is adapted to engage a corresponding divot formed in hub plate 52 as is described more fully below. Bracket 30 also includes an interface 34 for connecting to other attachments such as microphone stand adaptor 20. In this case, interface 34 includes female threads for receiving threads 24 extending from ball joint 22 on microphone stand adaptor 20. As shown in the figure, microphone stand adaptor 20 includes a ball joint 22 with adaptor threads 24. It should be understood that other interface connections may be used such as snaps, clips, cooperative, tongue and groove arrangements, cooperative hook and loop materials, and the like. The stand adaptor 20 also includes a thumb screw 26 for tightening the ball joint in the desired position. Microphone stand adaptor 20 includes an interface 28 for attachment to a microphone stand or other platform. Adapter bracket 30 may be molded plastic or machined from metal such as aluminum or steel.

Figure 6:
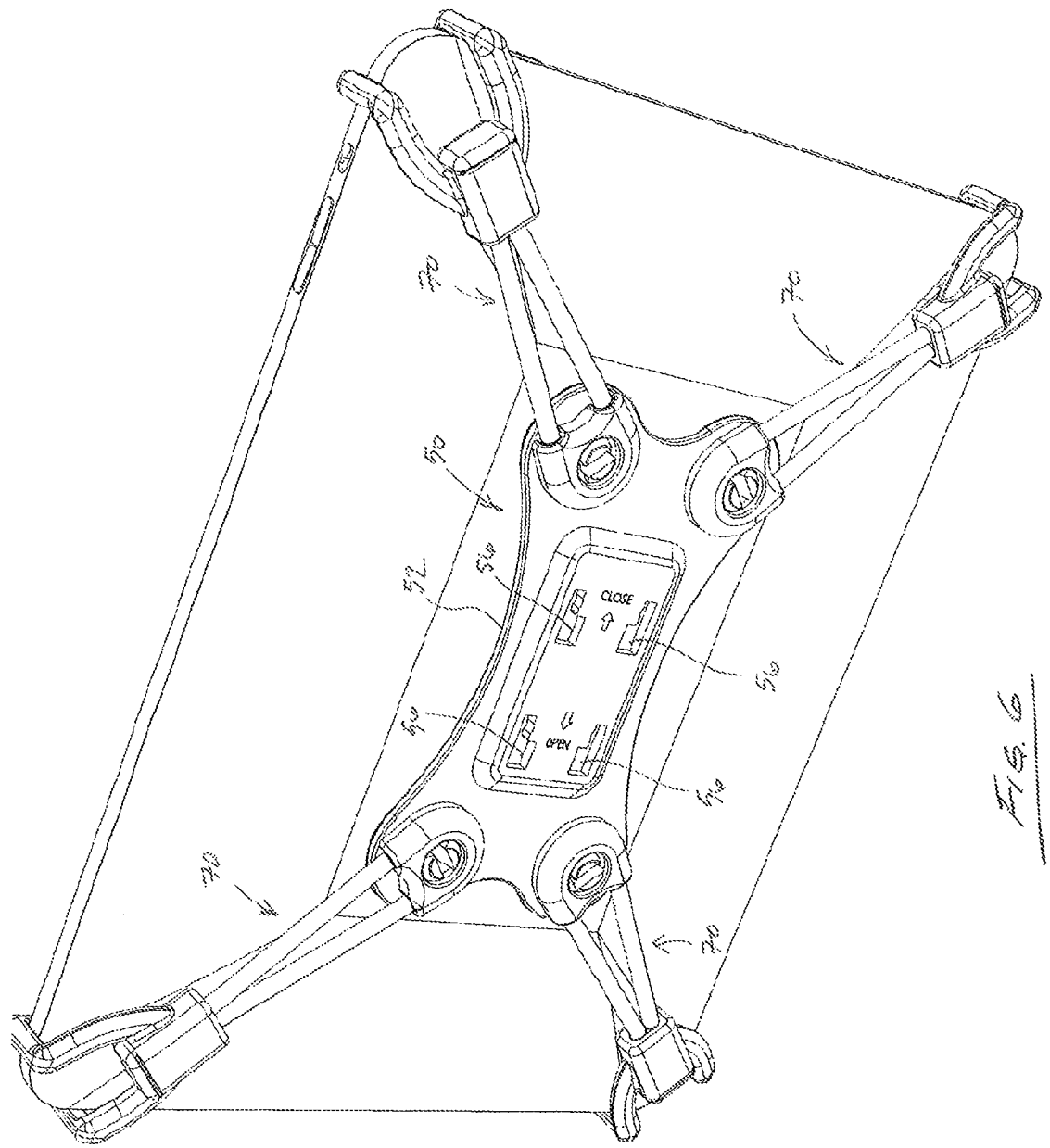
FIG. 6 is a perspective view of a holding device grasping a flat item with the bracket and stand mount removed.
Figure 7:
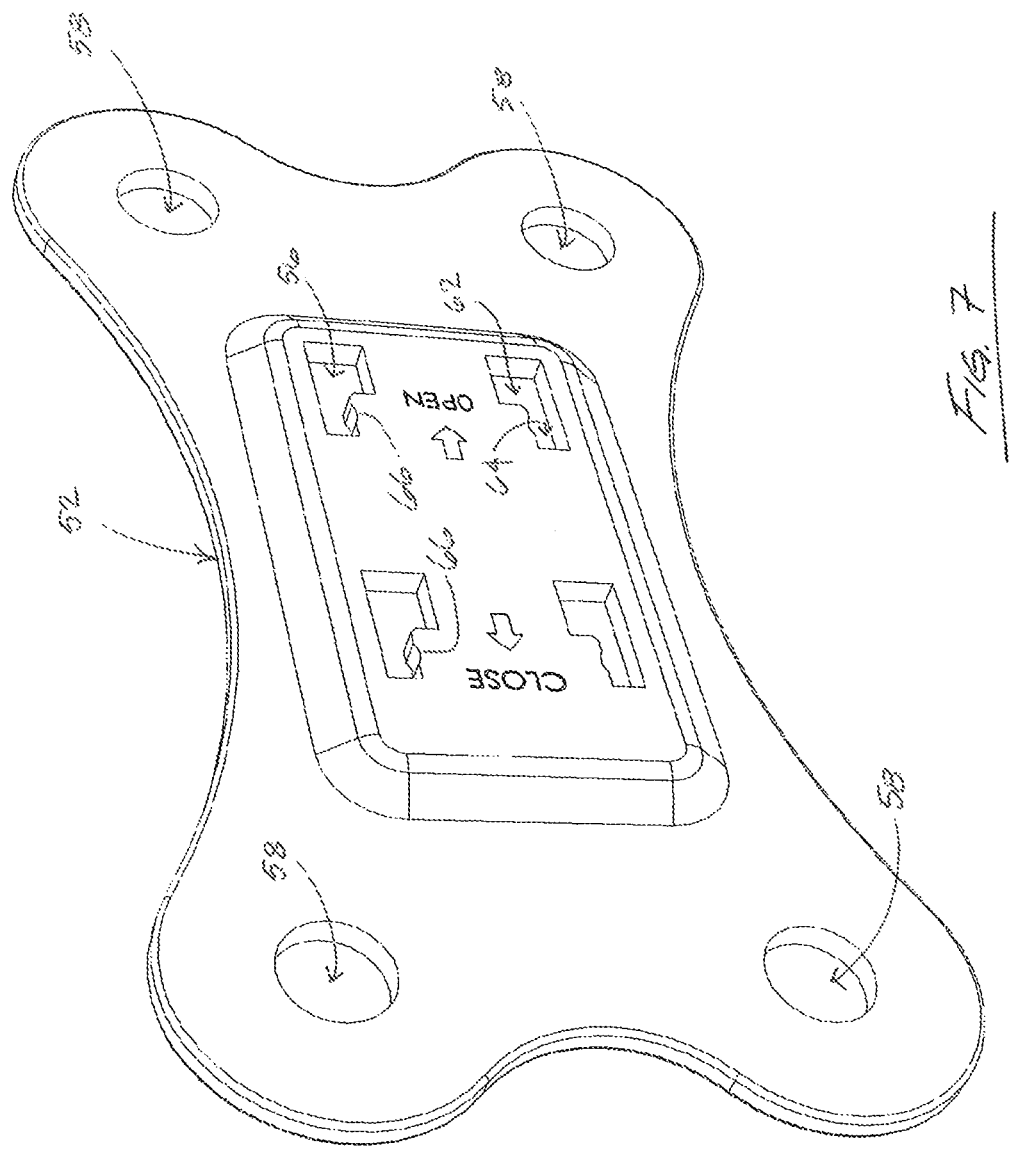
FIG. 7 is a perspective view of the hub plate as shown from the back of the hub.
Figure 8:
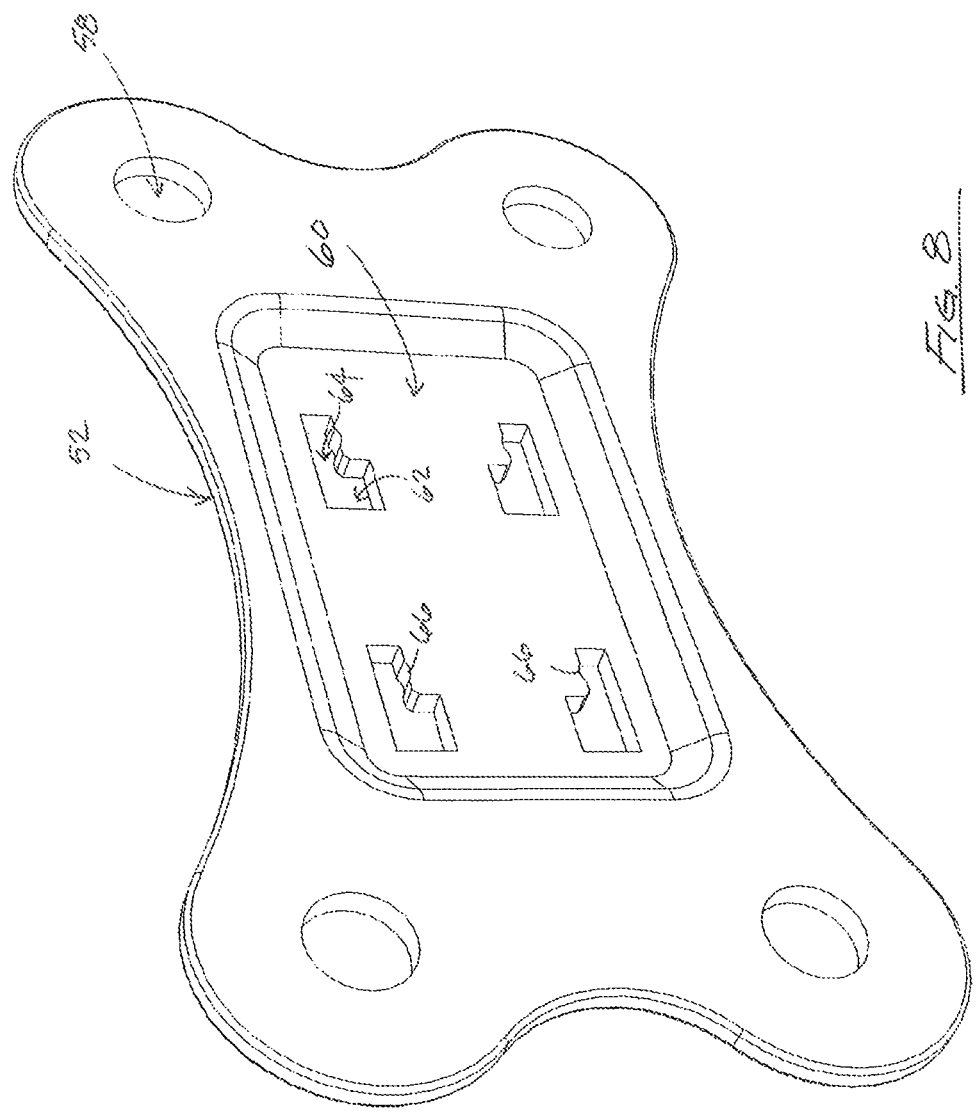
FIG. 8 is a perspective view of the hub plate as shown from the front.

With reference to FIG. 6, adapter bracket 30 engages apertures 56 that are formed in hub plate 52. Bracket 30 is engaged with the hub plate 52 and slid into a locked position or closed position as indicated by the indicia on hub plate 52. With further reference to FIGS. 7 and 8, hub plate 52 includes a recessed region 60 that provides clearance for prongs 36 when the bracket 30 is engaged with the hub plate 52. Each mounting bracket aperture 56 includes a first large opening 62 connected to a smaller open portion 64. Smaller open portion 64 includes a divot 66 formed around a portion of its perimeter. Divot 66 is configured to engage protuberance 38 which is formed on prong 36. Thus, it can be appreciated that when bracket 30 is installed, the prongs 36 are inserted into the larger open portion 62, at which point the bracket 30 is slid towards the smaller open portion 64 such that protuberances 38 engage a corresponding divot 66 and the prongs are captured in the smaller open portion 64. When protuberances 38 engage the divots 66, the bracket is held in place on hub 52. It is contemplated that as an alternative to a separate adapter bracket, that the adapter interface 34 could be integrally formed with the hub plate. Hub plate 52 also includes a plurality of apertures 58 for attaching a respective grappling assembly as explained below. Hub plate 52 may be formed of any suitable material such as plastic or metal. Plate 52 may be formed by stamping material such as aluminum or steel sheet metal. As another example, hub plate 52 may also be formed from molded plastic.

Figure 9:
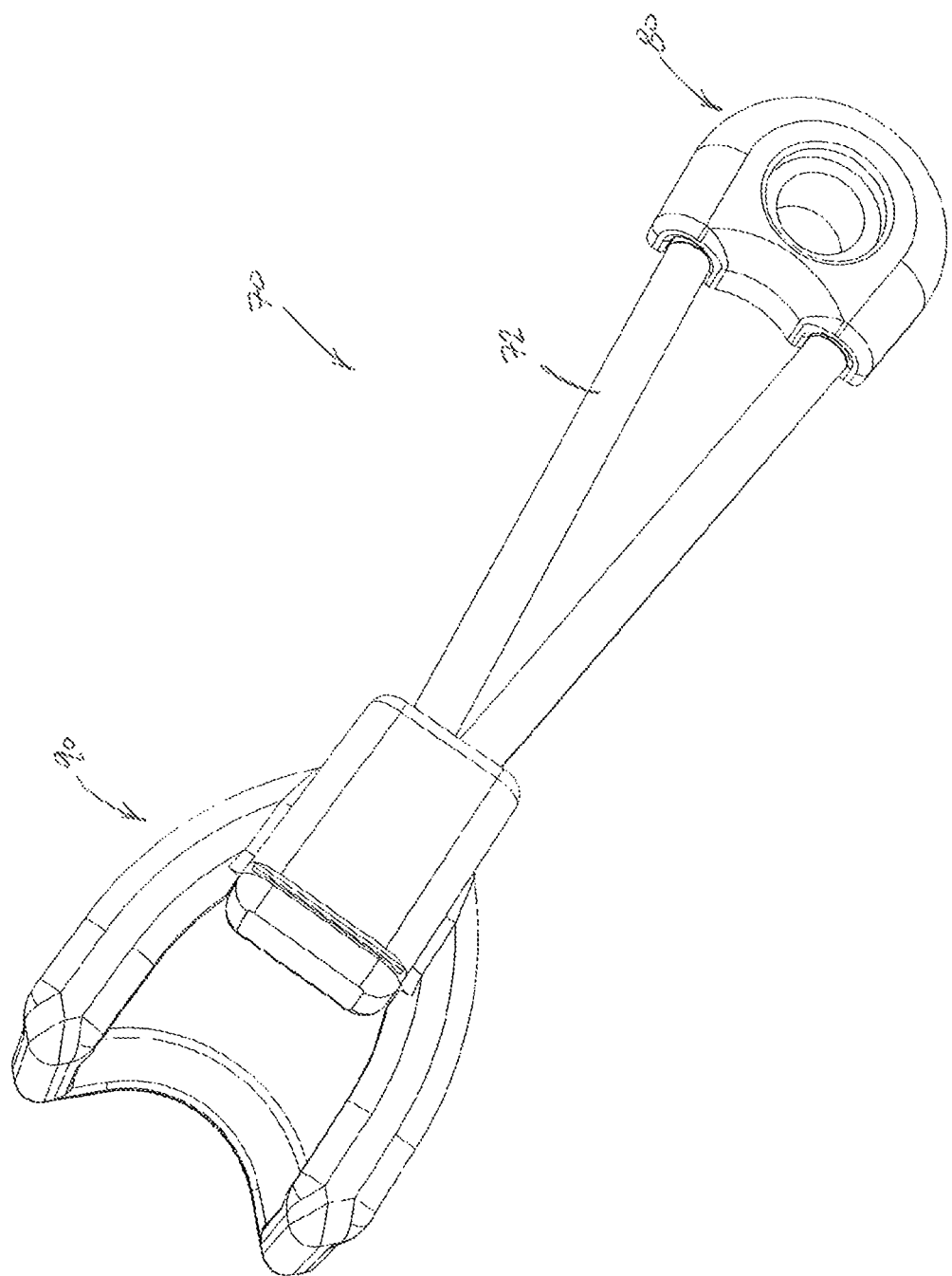
FIG. 9 is a perspective view of a grappling assembly as viewed from underneath.
Figure 10:
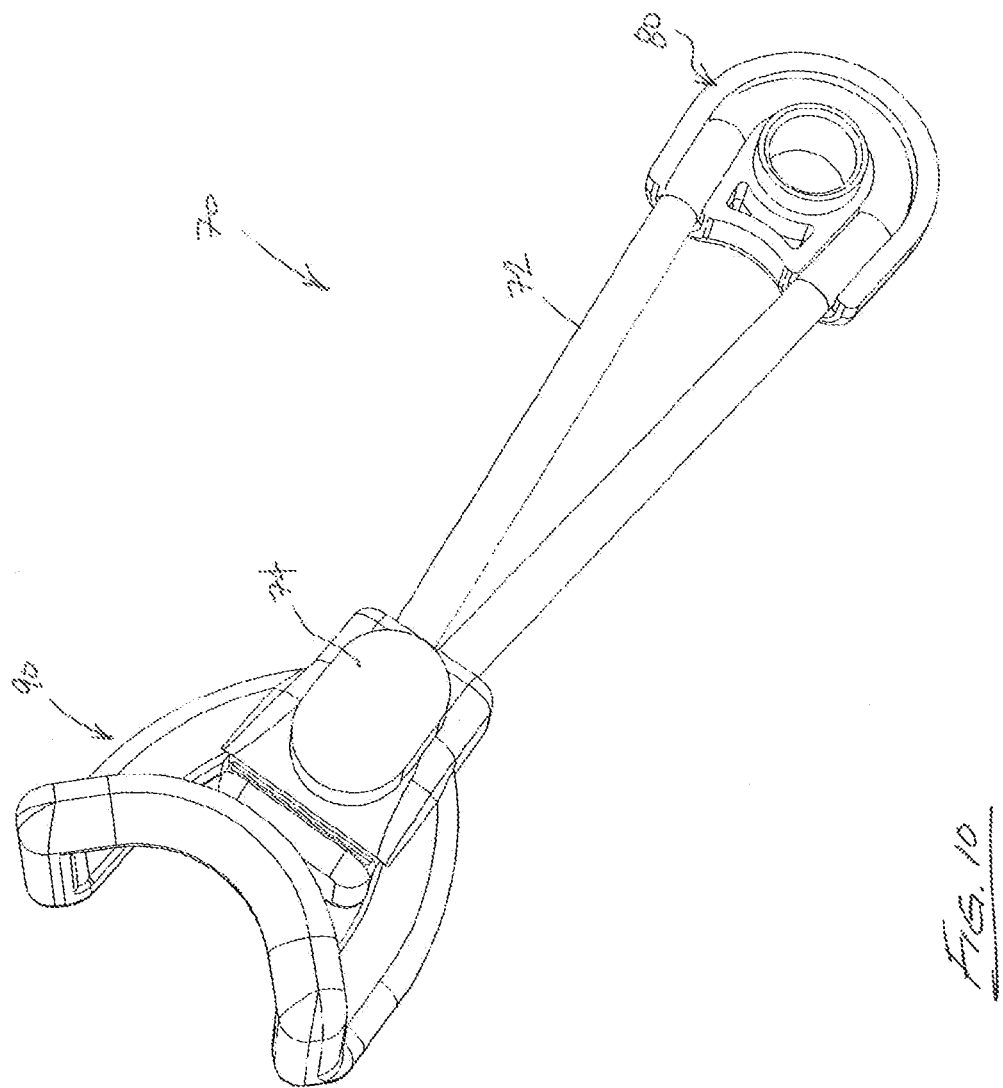
FIG. 10 is the grapping assembly shown in FIG. 9 as shown from the top side.

As can be seen in FIG. 6, for example, the holding device 10 includes a plurality of grappling assemblies 70. Each of the grappling assemblies are constructed in the same manner. Broadly, each grappling assembly includes a tension member and a hook. In an embodiment shown in FIG. 9, grappling assembly 70 includes a hook 90, a thimble 80, and a tension member 72, also referred to as a tensioning member, extending therebetween. With further reference to FIG. 10, the hook includes a resilient pad 74, which may be comprised of a similar material as that used to form resilient pads 54. Again, resilient pad 74 prevents damage to the item being grasped.

Figure 11:
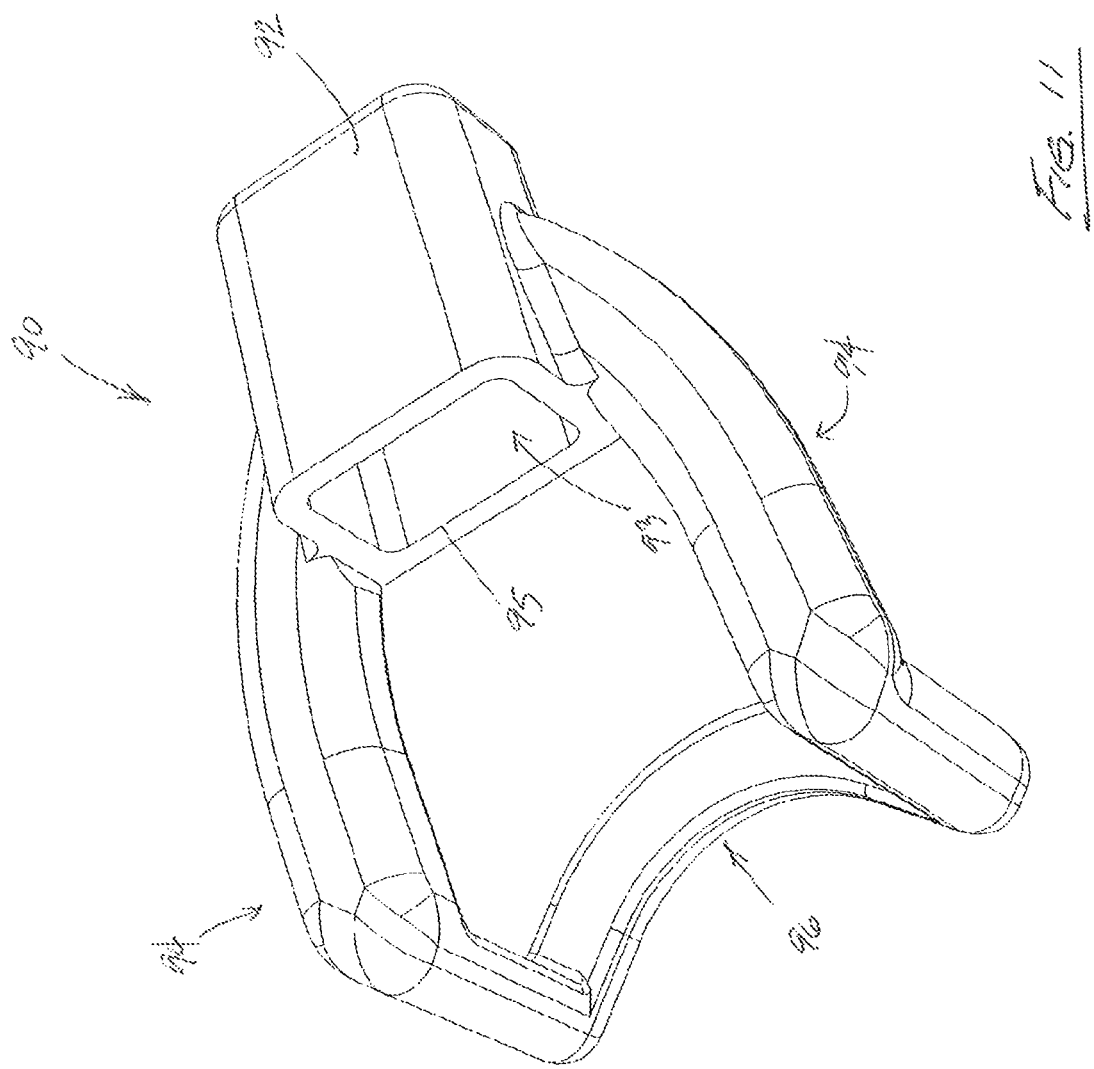
FIG. 11 is a perspective view of a hook as viewed from the front.
Figure 12:
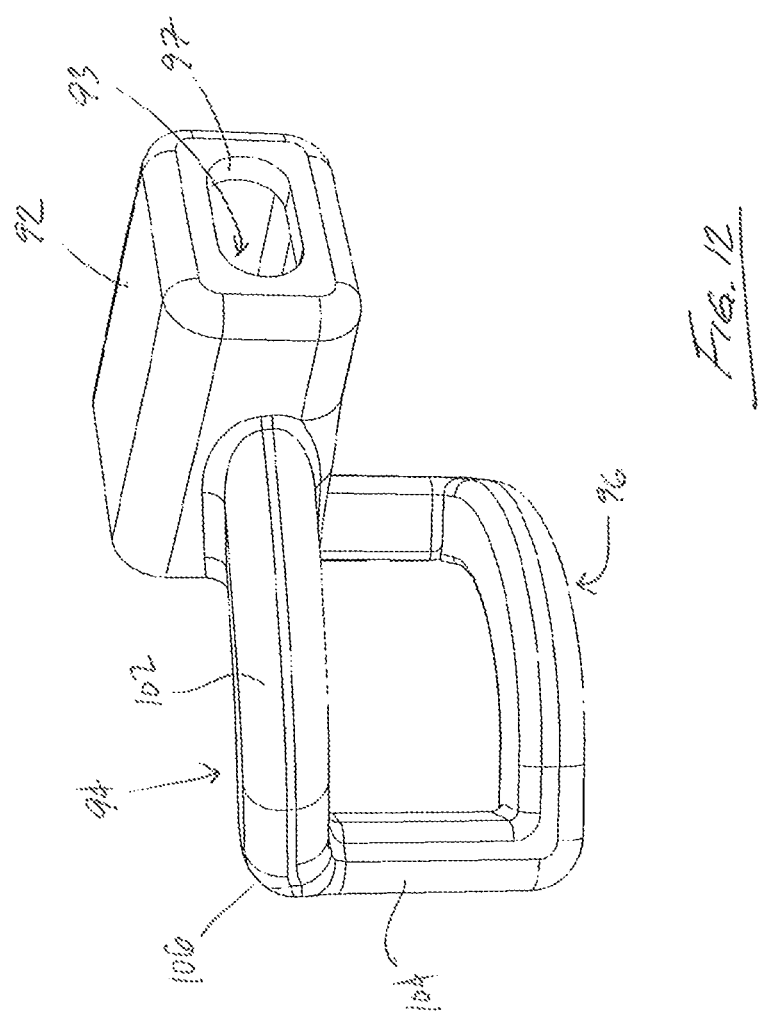
FIG. 12 is a perspective view of the hook as shown from the back.

As shown in FIG. 11, hook 90 includes a central body portion 92 which includes cavity 93 having first and second open ends 95 and 97, respectively. Hook 90 includes a pair of arms 94 extending laterally from body portion 92. The arms are joined together by an arcuate bridge portion 96 that helps keep the hook from slipping off the edge/corner of the item. With further reference to FIG. 12, each arm 94 includes an upper arm portion 102 and a forearm portion 104 connected at elbow 106. Upper arm portion 102 and forearm portion 104 are angled at approximately 90 degrees to each other. However, they may be angled ranging from about 45 to about 135 degrees. Hooks 90 may be formed from molded plastic, or alternatively, may be cast or formed from metal and preferably coated with a plastic material in order to protect the item being grasped by the hook.

Figure 13:
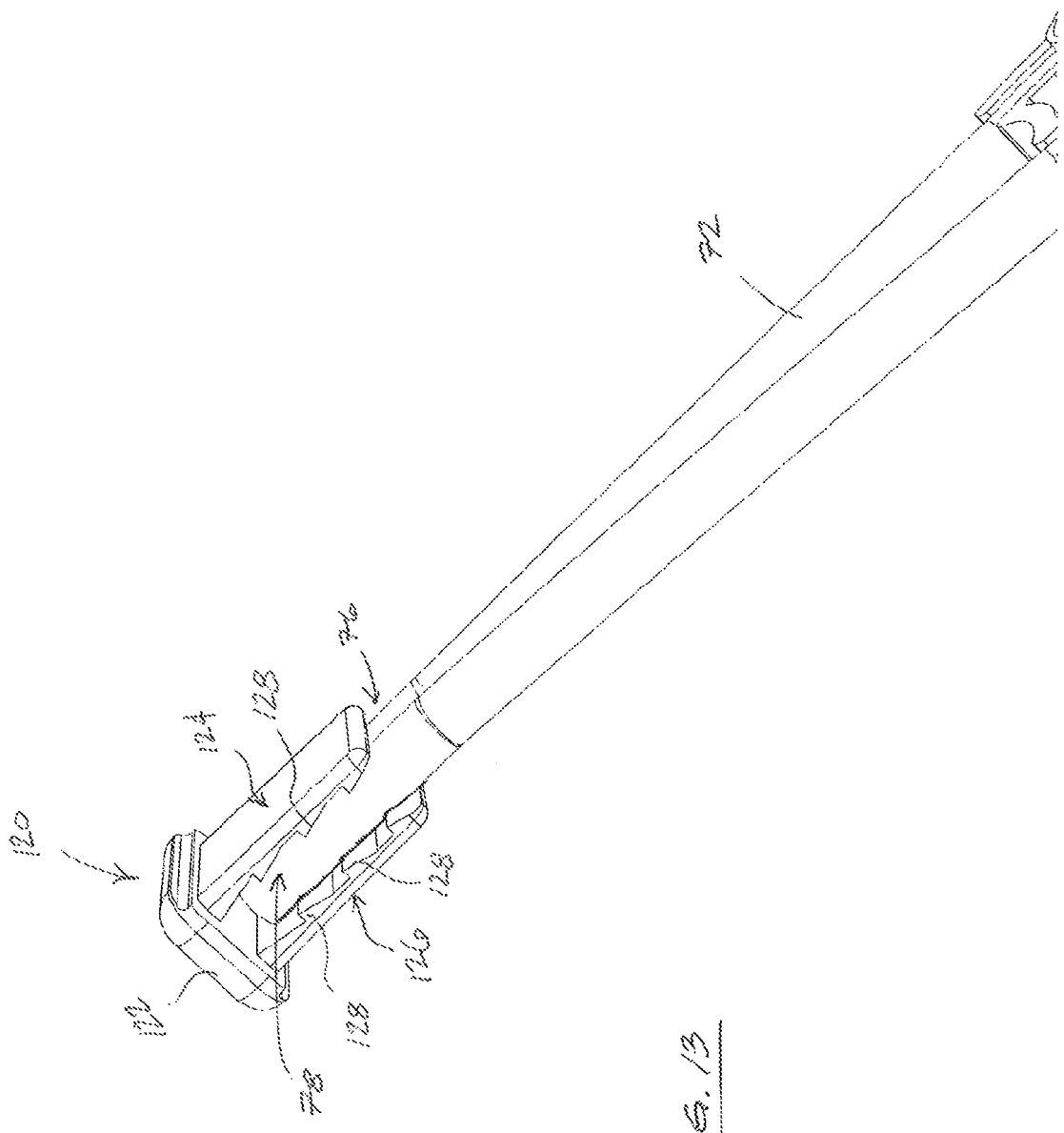
FIG. 13 is a perspective view illustrating a jaw fitting engaging a tension member.
Figure 14:
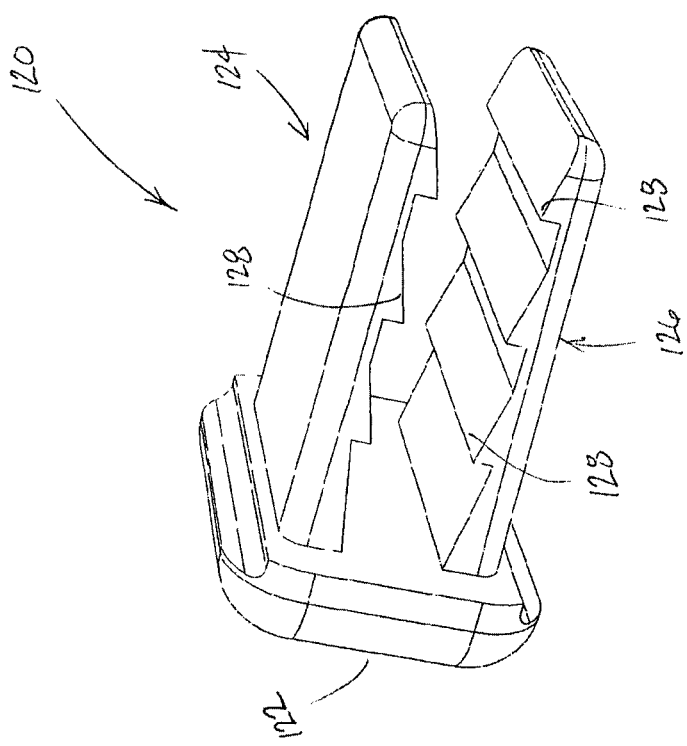
FIG. 14 is an enlarged perspective view of the jaw fitting.

As shown in FIG. 13, the jaw fitting 120 includes a cap portion 122 with a pair of tangs 124 and 126 extending therefrom. With further reference to FIG. 14, each tang 124 and 126 includes a plurality of teeth 128 disposed thereon. As shown in FIG. 13, the teeth 128 are operative to grasp the tension member 72. Tension member 72 extends through opening 97 and is engaged by jaw fitting 120. In this case, tension member 72 is grasped at first and second end portions 76 and 78, respectively, thereby creating a looped tension member. It can be appreciated that jaw fitting 120 is sized and configured to be received in cavity 93 which is formed in body portion 92 of hook 90 (See FIG. 9). Accordingly, as jaw fitting 120 is inserted into the open end 95 and into cavity 93, tangs 124 and 126 are urged to clamp down on tension member 72. Tension member 72 may be comprised of resilient materials such as elastic cord. Tension member 72 may also comprise an extension spring, for example. Jaw fitting 120 may be formed of any suitable material such as molded plastic, aluminum, or other material. Given the arrangement of jaw fitting 120 and tension member 72, it can be appreciated that the grappling assembly 70 may be adjusted in length by disconnecting jaw fitting 120 from hook 90 and either replacing the tension member 72 with a longer piece of material or by shortening the tension member 72. Thus, the holding device is adaptable to fit various sized items.

Figure 15:
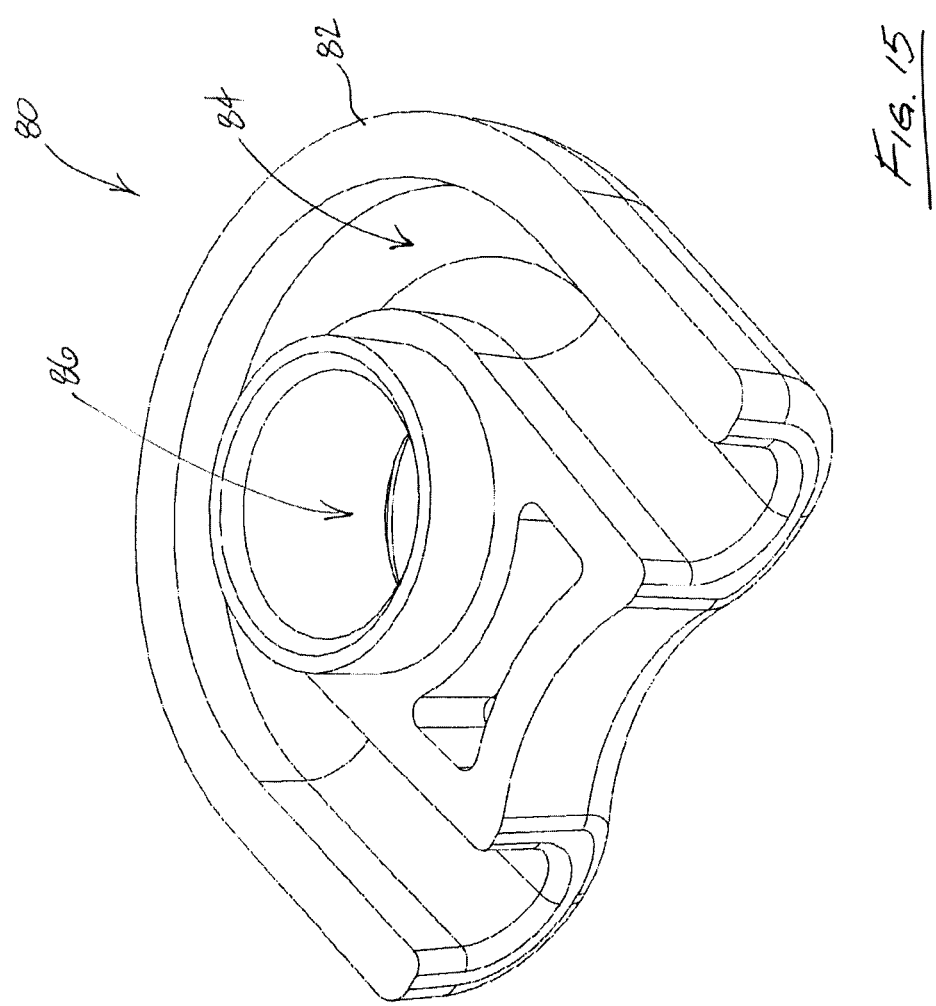
FIG. 15 is an enlarged perspective view of a thimble as viewed from the top.

As shown in FIG. 15, thimble 80 includes a body portion 82 with an aperture 86 formed therethrough. Extending around aperture 86 is a channel 84 which is sized and configured to receive the tension member 72. It can be appreciated that, in this case, thimble 80 includes a channel that is open on one side. However, the thimble 80 may be formed with an open side wall or may be a fully enclosed channel or pathway through which the tension member 72 extends. In this case, the thimble is formed of molded plastic material. However, the thimble may be formed of other suitable materials, such as, aluminum.

While the grappling assemblies are shown as having a looped elastic cord, the grappling assembly may comprise a single strand or multiple strands. Furthermore, the tension member, hook, and thimble may be integrally formed into a unitary construction. For example, the hook and tension member may be insert molded together to form a unitary hook and tension member.

Figure 16:
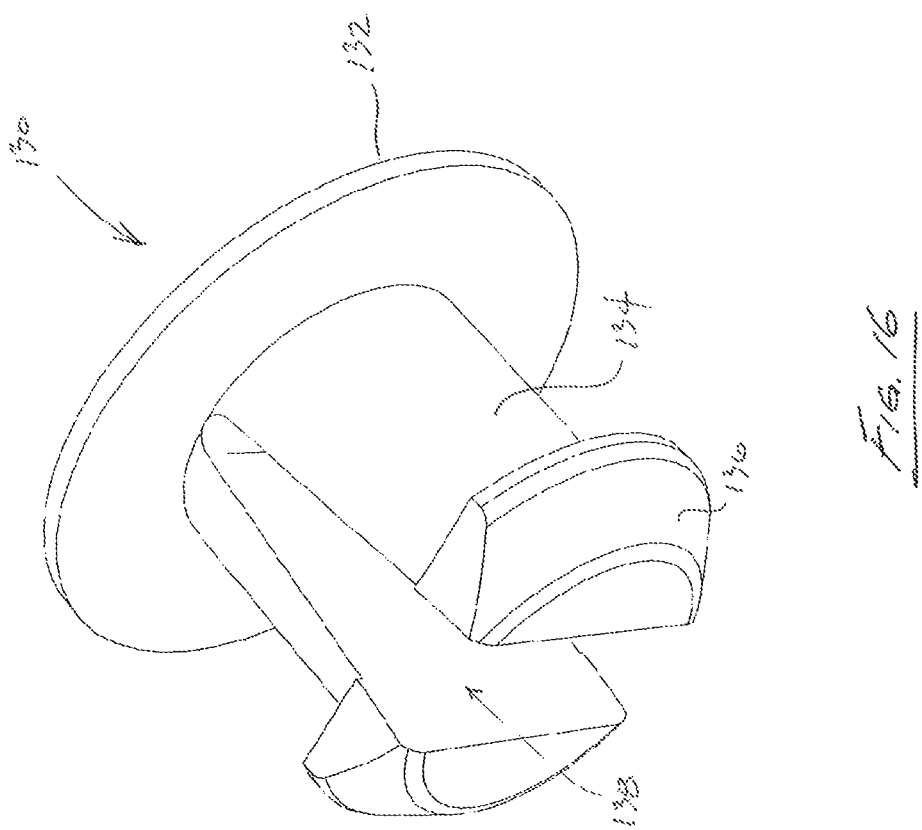
FIG. 16 is a perspective view of a hub fastener.

FIG. 16 illustrates a fastener 130 for attaching grappling assemblies 70 to hub assembly 50. Fastener 130 includes a head portion 132 and a shank 134 with a barb 136 formed thereon. Shank 134 includes a central split region 138 which allows the fastener 130 to be snap-fit into holes 58 formed through hub plate 52. Referring once again to FIGS. 6 and 4, for example, it can be appreciated that each grappling assembly 70 is retained on a hub assembly 50 by inserting a fastener 130 through mounting hole 58 and engaging barb 136 with the open aperture of the thimble 80. Each grappling assembly 70 may rotate or pivot about its mounting point on hub 50, thereby allowing the holding device to be adaptable to various shaped flat items.

Figure 17:
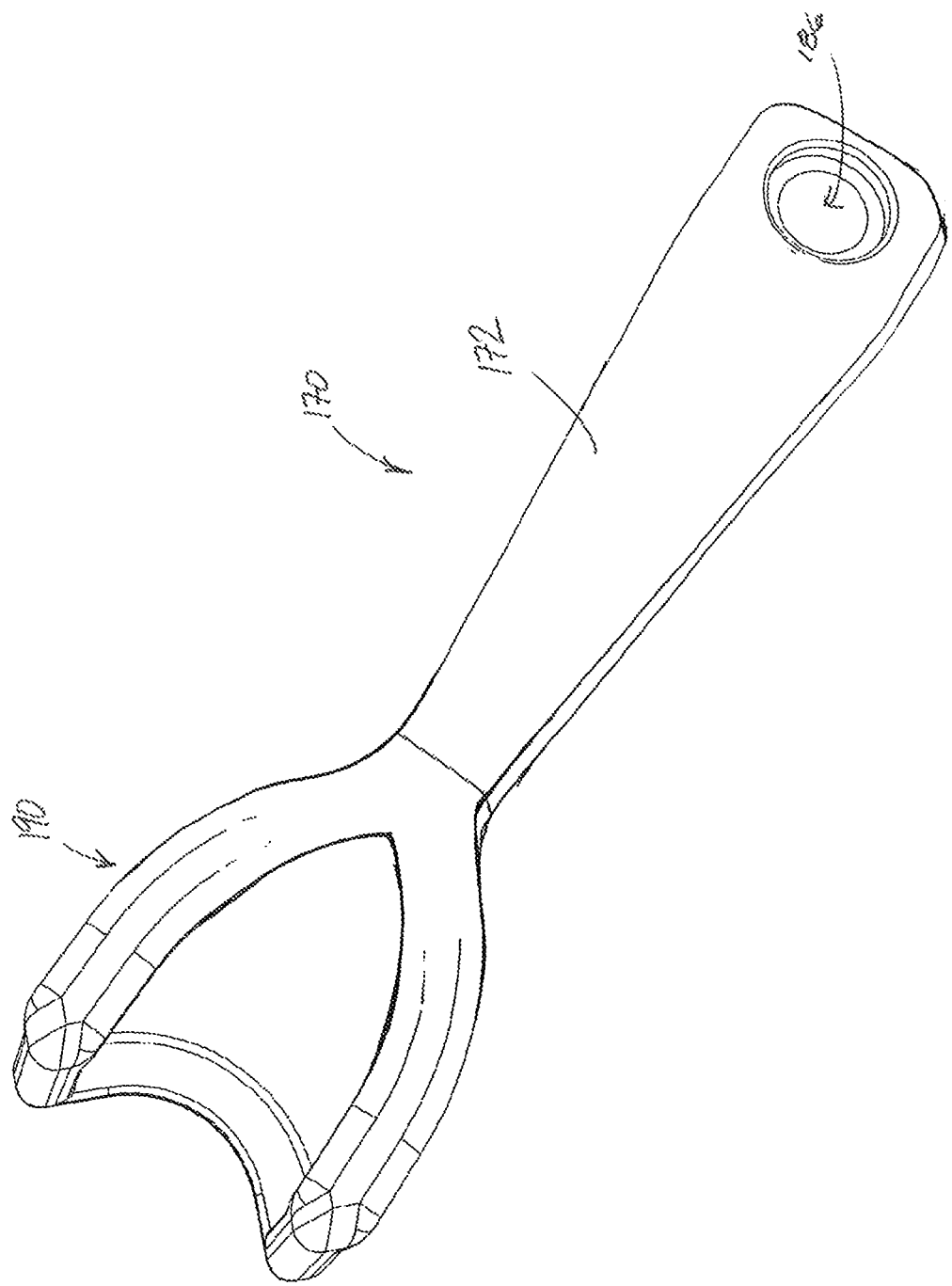
FIG. 17 is a perspective view of a grappling assembly according to a second exemplary embodiment.

FIG. 17 illustrates a grappling assembly 170 according to a second exemplary embodiment. In this embodiment, the grappling assembly 170 may be formed of a unitary tension member 172 which is integrally formed with hook 190. Tension member 172 includes an aperture 186 that may be used to attach grappling assembly 170 to hub 50 in FIGS. 1 and 3, for example. Tension member 172 may be formed of resilient material such as rubber or the like. In this case, hook 190 is integrally formed with tension member 172 by insert molding hook 190 onto the tension member. Insert molding is well known in the art. Similarly, aperture 186 may be comprised of a metal grommet or plastic grommet, which is also insert molded into tension member 172.

Figure 18:
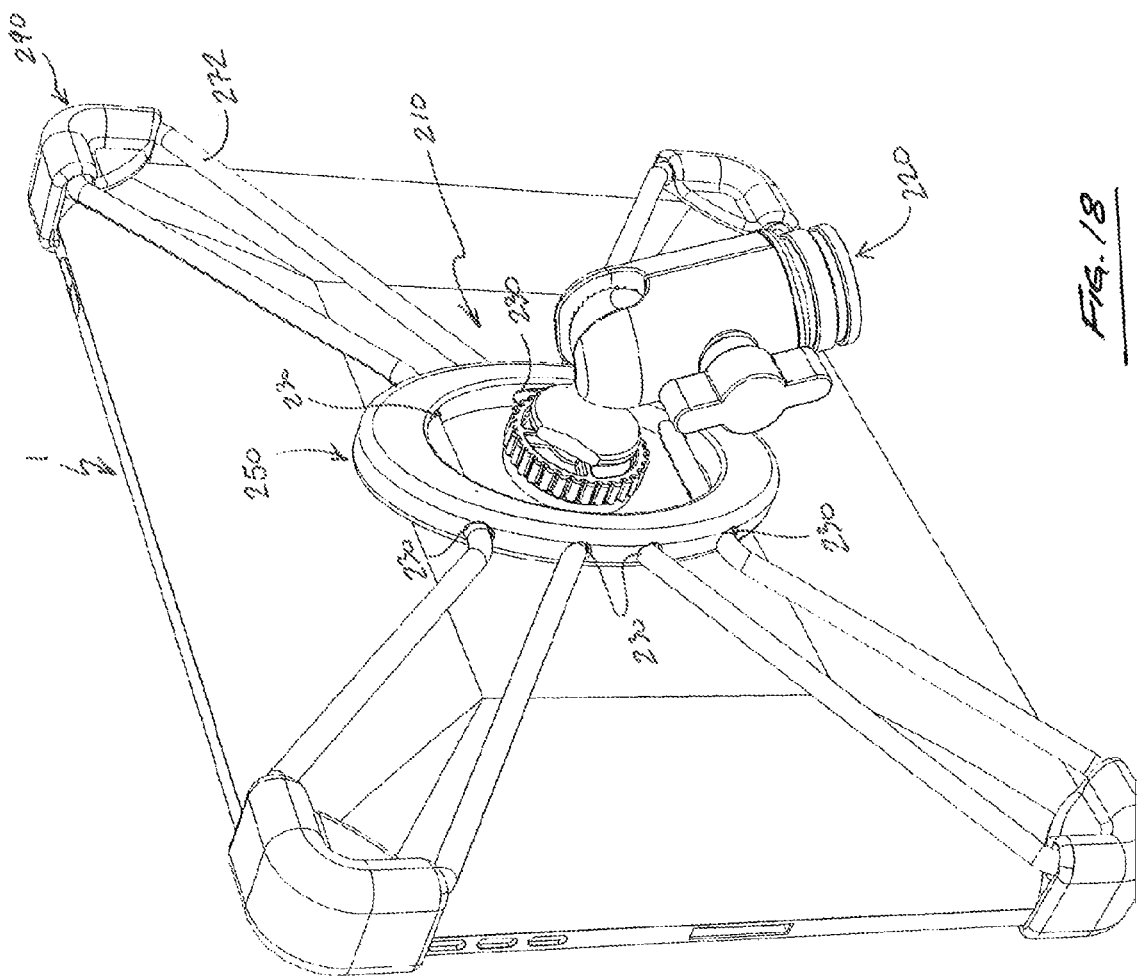
FIG. 18 is a perspective view of a holding device according to a third exemplary embodiment as viewed from the back of the holding device.
Figure 19:
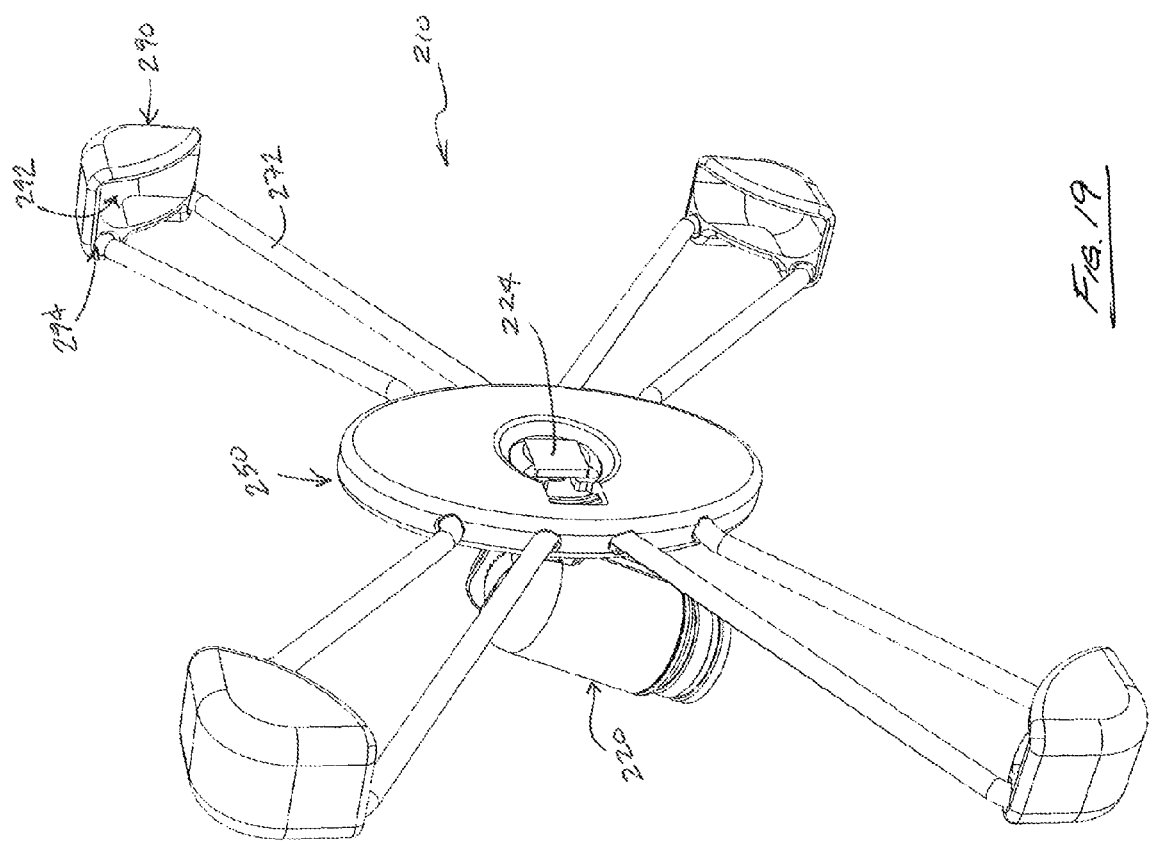
FIG. 19 is a perspective view of the holding device shown in FIG. 18 as viewed from the front of the holding device.

FIG. 18 illustrates a holding device 210 according to a third exemplary embodiment. In this embodiment, hooks 290 are attached to central hub 250 via a single strand of tension material 272 which is threaded through apertures 230 formed in the central hub 250, as shown. With further reference to FIG. 19, each corner hook 290 includes a passageway 294 adapted to receive tension member 272 therethrough. Accordingly, it can be appreciated that a single strand of elastic 272 provides the tensioning to hold each hook 290 on the corner of a flat item. Each hook 290 includes a cavity 292 sized and configured to accommodate the corner of the flat item.

Figure 20:
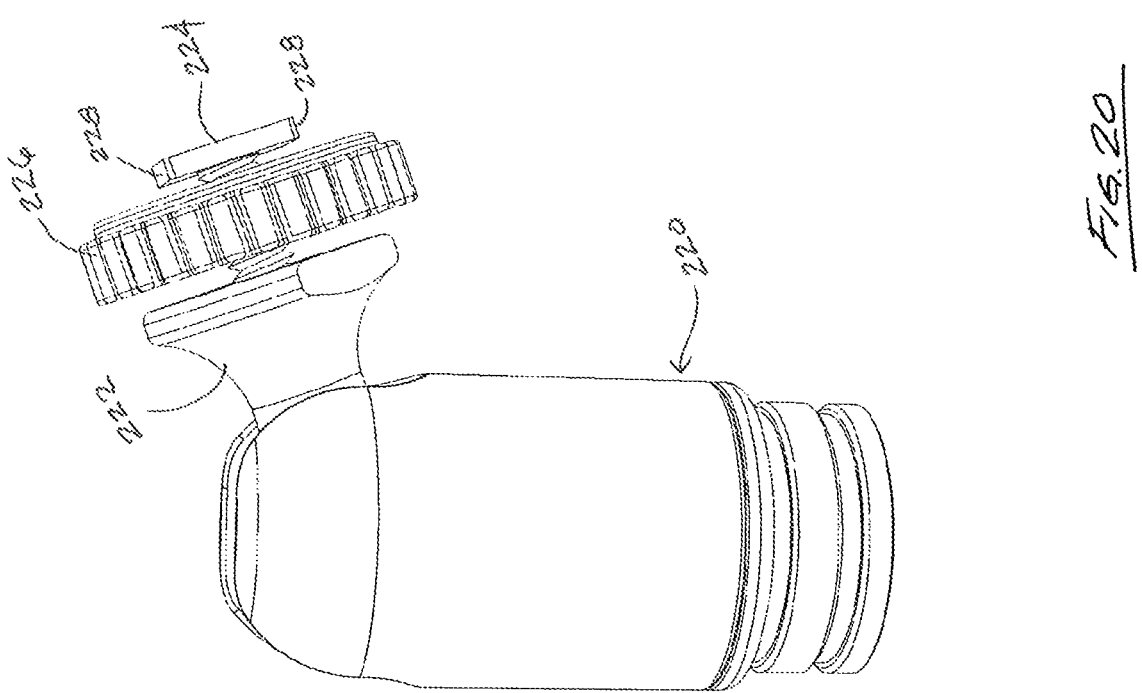
FIG. 20 is a side view in elevation of the stand mount shown in FIGS. 18 and 19.
Figure 21:
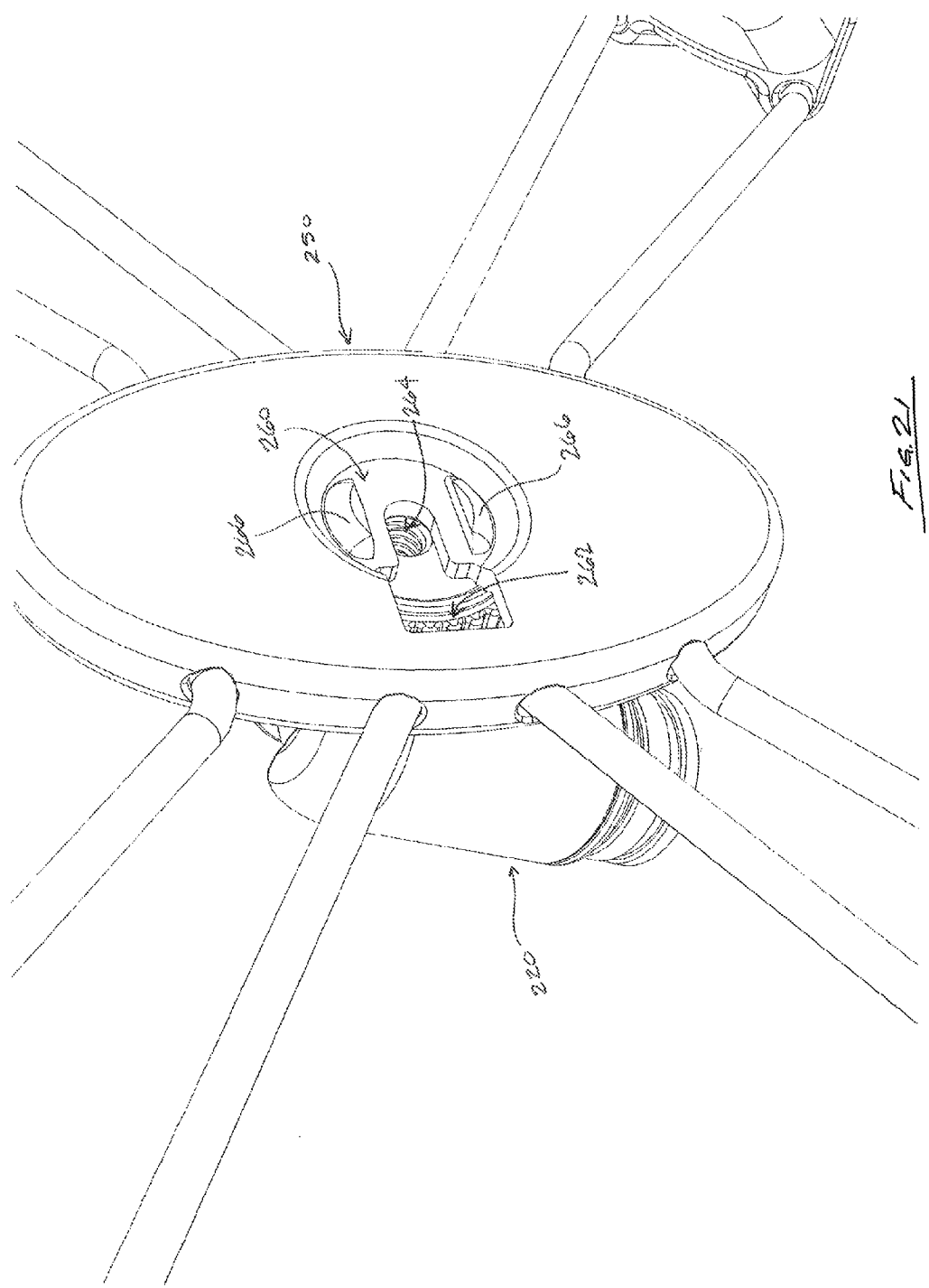
FIG. 21 is an enlarged partial perspective view of the hub assembly of the third exemplary embodiment shown in FIGS. 18 and 19.

Holding device 210 may also include a microphone stand adaptor 220. The microphone stand adaptor 220, as shown in FIG. 20, includes a ball joint portion 222 into which is threaded a carriage bolt 224. Carriage bolt 224 includes at least two flat sides 228, which engage the central hub 250 to prevent rotation thereof. A thumb wheel 226 is threadably attached to carriage bolt 224 and is used to tighten the carriage bolt 224 against central hub 250. With further reference to FIG. 21 (carriage bolt 224 is hidden for clarity), central hub 250 includes a recessed region 260 that provides clearance for the carriage bolt head 224. Within the recessed region 260 are a pair of protrusions 266 which, with reference to FIG. 19, confront the flat sides 228 of carriage bolt 224 to prevent rotation thereof. Central hub 250 includes a large opening 262 which is connected to a smaller opening 264. The large opening 262 is sized to receive the head portion of carriage bolt 224. However, the smaller open region 264 is only large enough to accept the shaft or threaded portion of carriage bolt 224. It can thereby be appreciated that the carriage bolt is installed by inserting the head into the larger opening 262 and then sliding it sideways into the smaller region. Once the carriage bolt is engaged with a smaller opening 264, thumb wheel 226 is tightened against the back side of hub 250, thereby retaining the microphone stand adaptor 220 to central hub 250.

Figure 22:
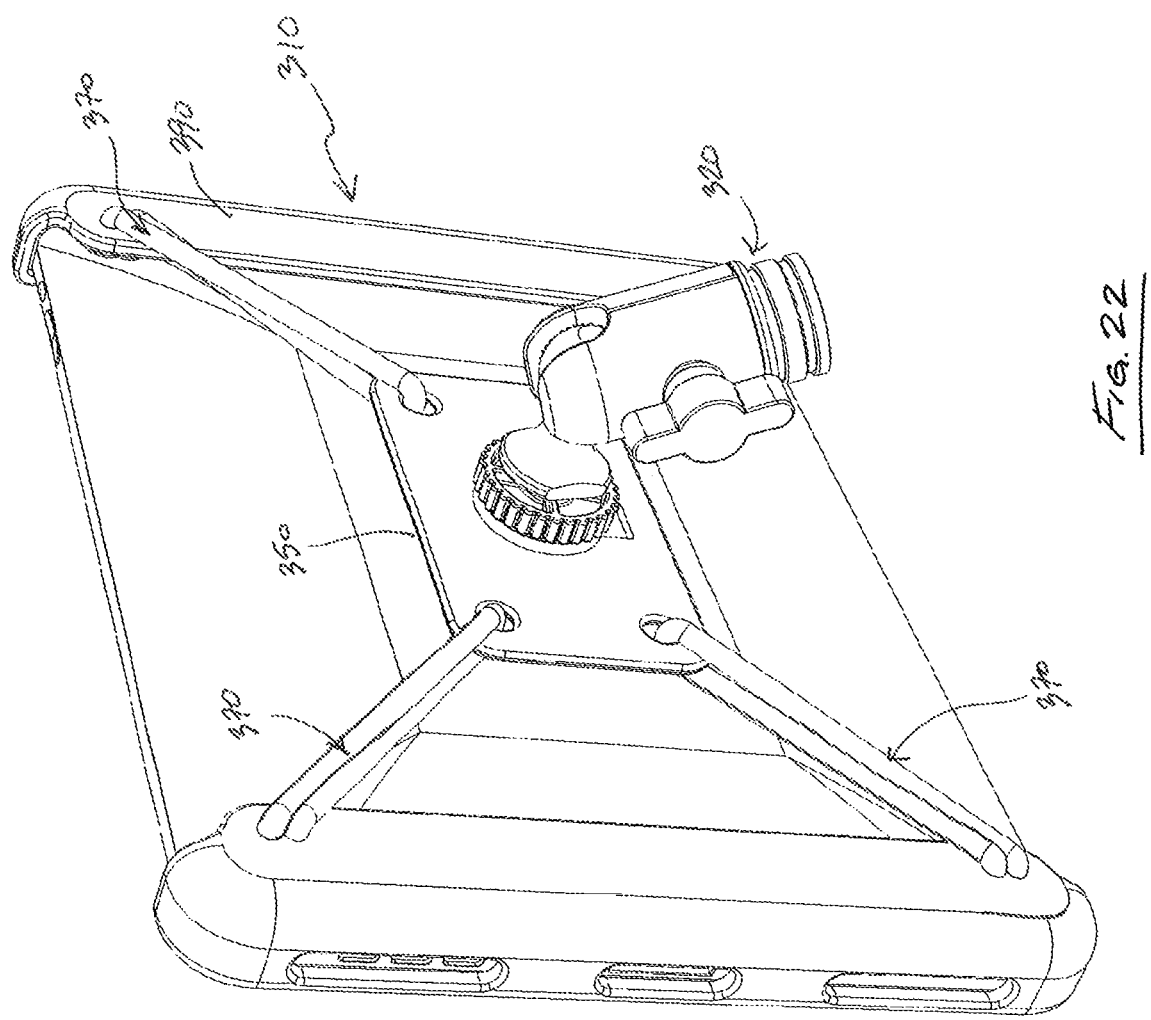
FIG. 22 is a perspective view of a holding device according to a fourth exemplary embodiment as viewed from the back of the holding device.
Figure 23:
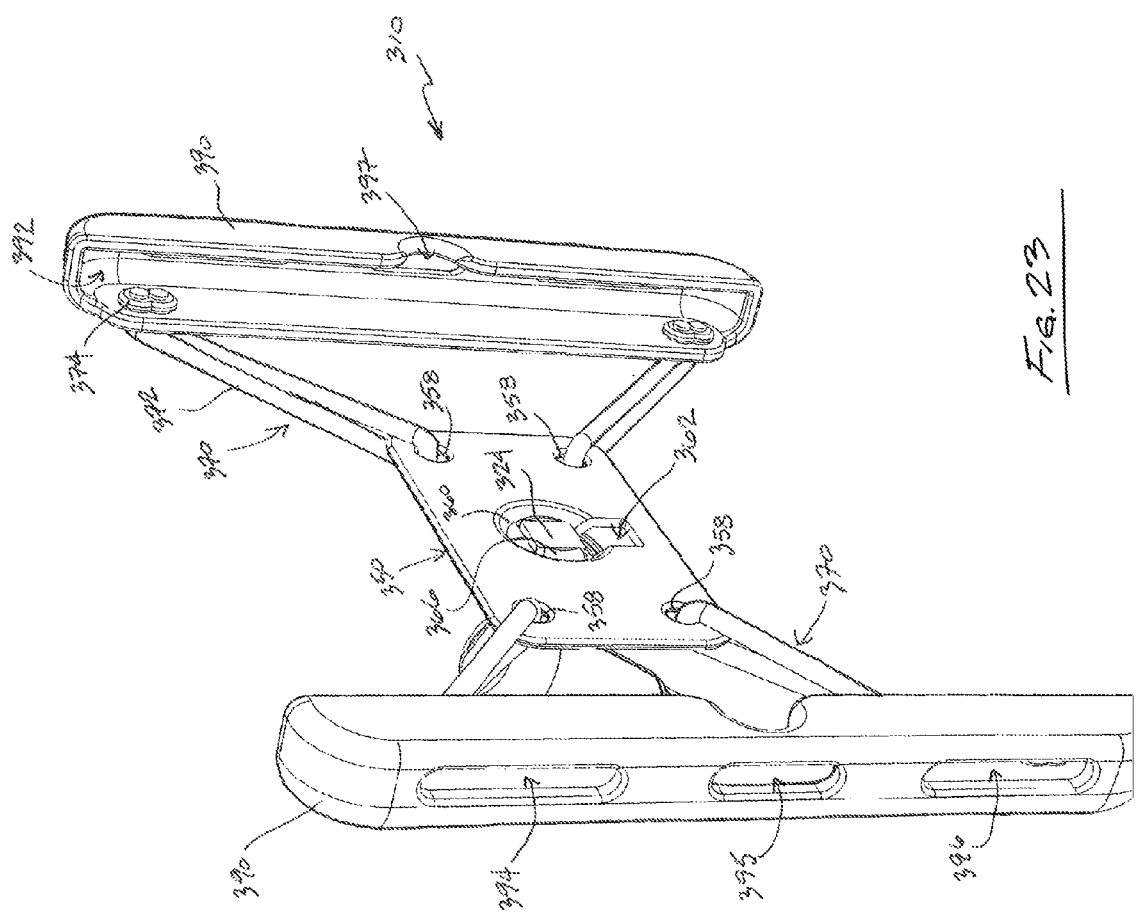
FIG. 23 is a perspective view of the holding device shown in FIG. 22 as viewed from the front of the holding device.

FIG. 22 illustrates a holding device 310 according to a fourth exemplary embodiment. In this embodiment, the holding device 310 includes a central hub 350 from which extend a plurality of tensioning members 370. In this case, each tension member 370 is a looped length of resilient cord 372, such as shock cord, which attaches to an end cap hook 390. With further reference to FIG. 23, the holding device 310 includes a pair of end cap hooks 390, which are sized and adapted to engage an entire end of the flat item. In this case, end caps 390 include a plurality of apertures 394, 395, and 396, which allow access to buttons and ports which are located on the ends of a tablet computer, for example. Furthermore, the end caps 390 may include various cutouts such as 397 to allow access to buttons on the face or the back of the tablet computer. The tension member 372 is captured on end cap 390 with a fitting 374. Fitting 374 may be a crimped on metal fitting or the like. Alternatively, tension member 372 is threaded through the end cap and knotted.

The microphone stand adaptor 320 in this embodiment is the same as described above. Accordingly, the central hub 350 includes a similar structure for receiving the carriage bolt 324. Specifically, hub 350 includes a recess 360 and openings 362 and 364 to receive the carriage bolt along with protrusions 366 which engage the carriage bolt to prevent it from rotating. The hub 350 also includes a plurality of apertures 358 through which the resilient members 372 are looped.

Figure 24:
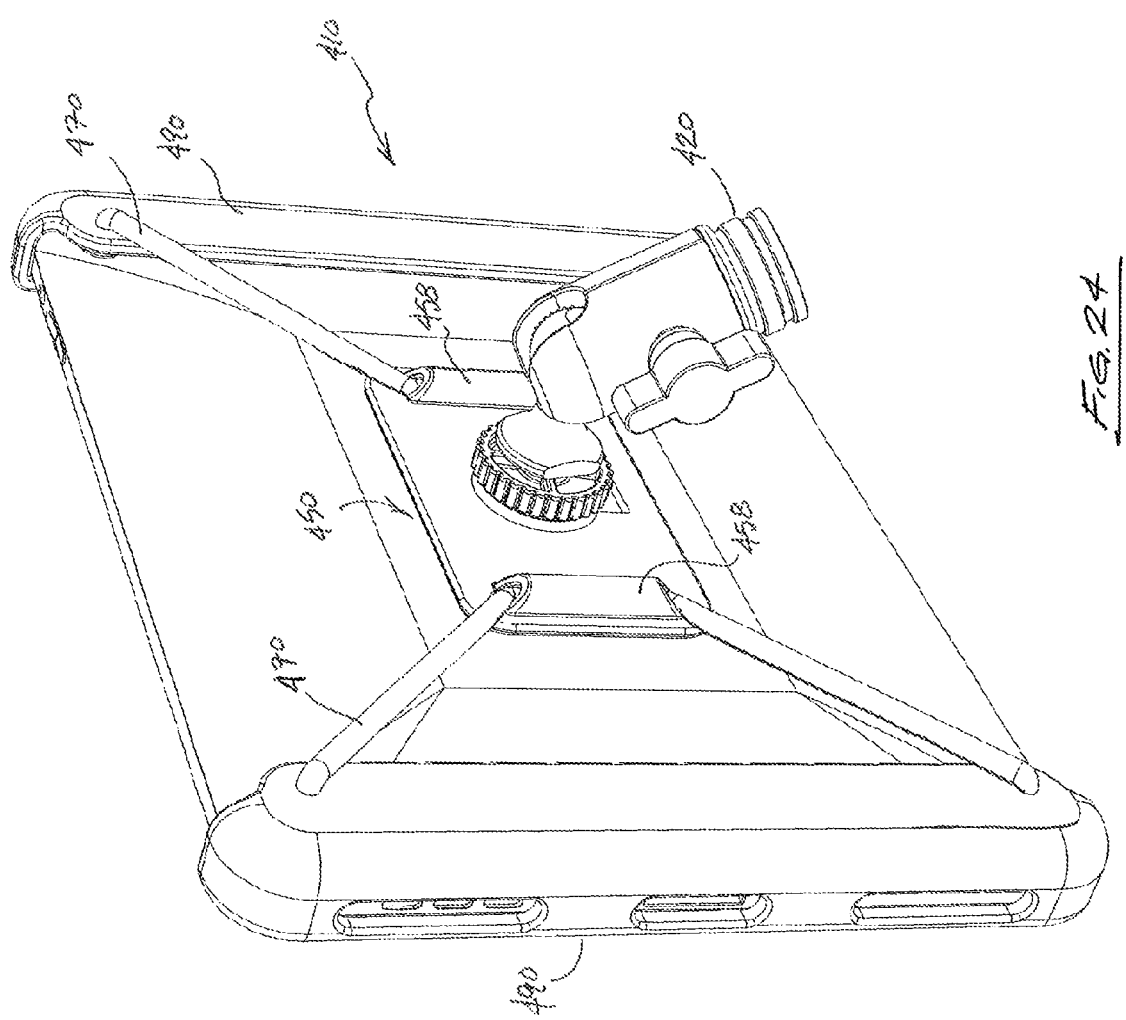
FIG. 24 is a perspective view of the holding device according to a fifth exemplary embodiment as viewed from the back of the holding device.
Figure 25:
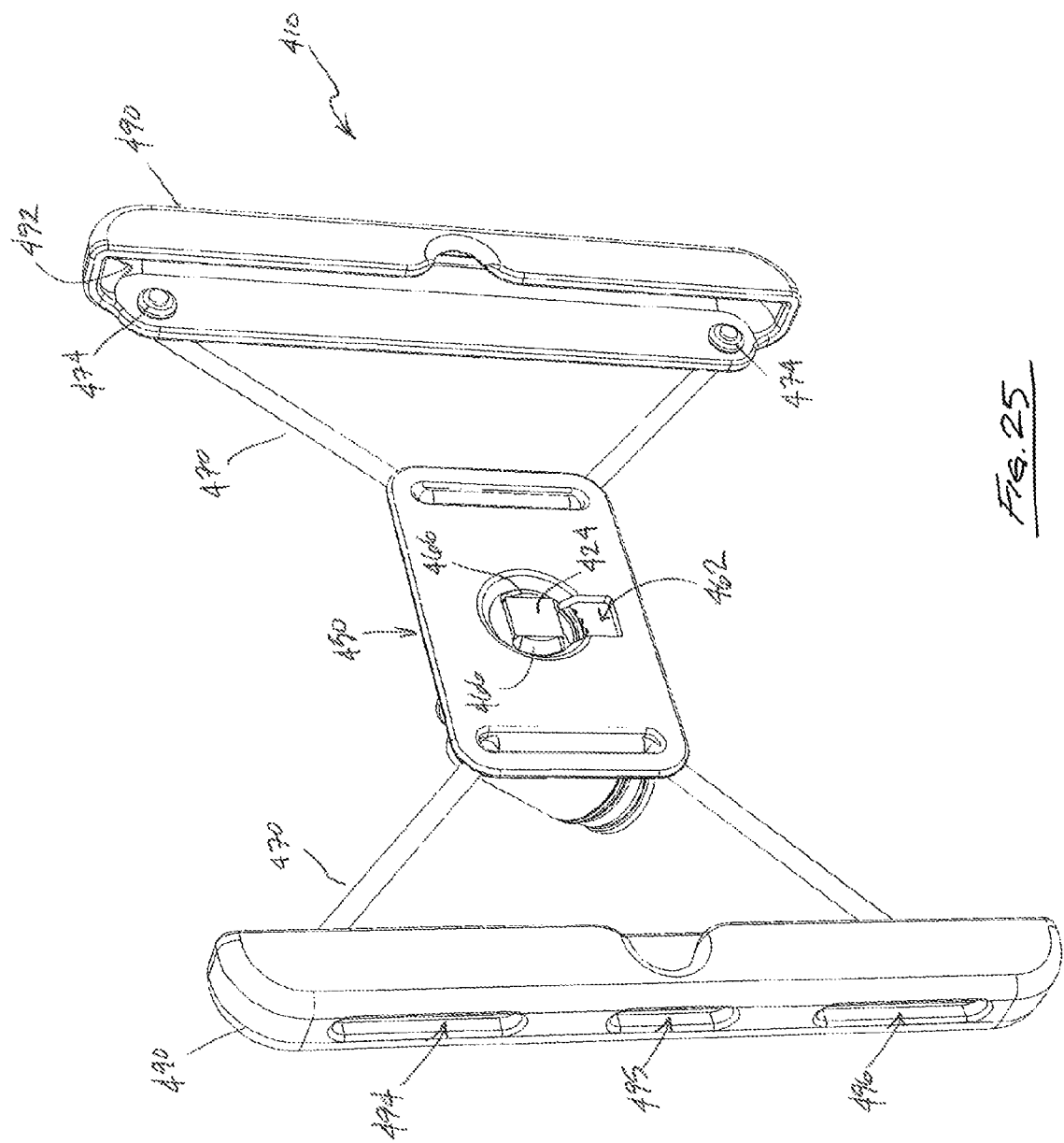
FIG. 25 is a perspective view of the holding device as shown in FIG. 24 as viewed from the front of the holding device.

FIG. 24 illustrates a holding device 410 according to a fifth exemplary embodiment. In this embodiment, the holding device 410 again includes end cap hooks 490 such as described above with respect to FIGS. 22 and 23. Holding device 410 may also include the same microphone stand adaptor 420 described above. In this case, however, hub 450 includes a pair of channels 458 formed therein. Each channel 458 receives a tension member 470 that is attached on each end to a respective end cap hook 490. With further reference to FIG. 25, each tension member 470 is attached to the end cap with fittings 474. Also shown in the figure is that end cap 490 includes a cavity 492 which receives the entire end of the tablet-like item. As shown in FIG. 25, channels 458 are open on the underneath side of the hub to facilitate threading of the resilient member 470 therethrough. Again, as the microphone stand adaptor 420 is the same as that described above, hub 450 includes similar structures including recess 460 and associated protrusions 466 which engage carriage bolt 424.

Figure 26:
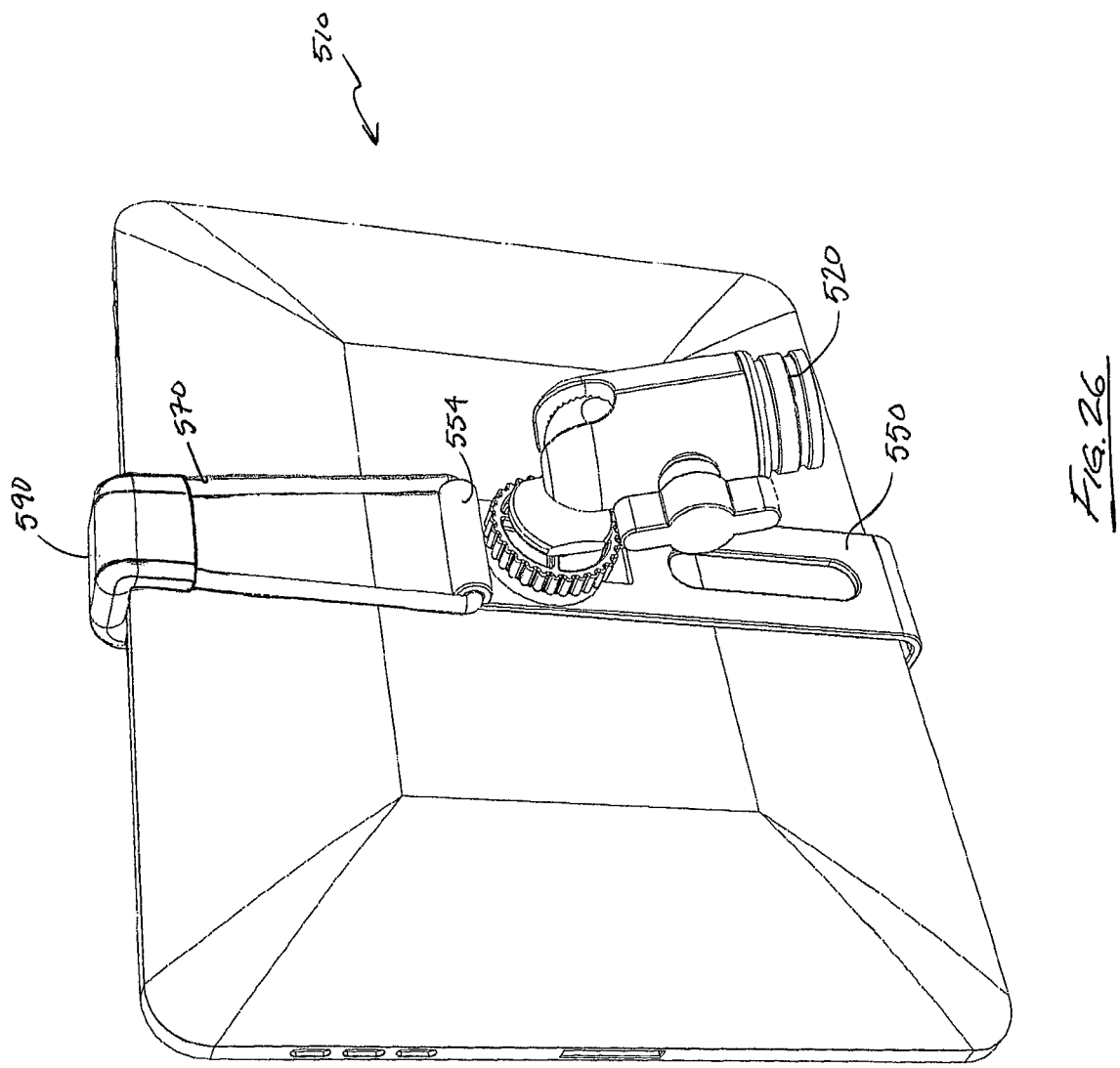
FIG. 26 is a perspective view of a holding device according to a sixth exemplary embodiment as viewed from the back of the holding device.

FIGS. 26 and 27 illustrate a holding device 510 according to a sixth exemplary embodiment. In this case, the holding device 510 grasps a flat item along two opposed edges with a single hook on each end. Holding device 510 includes a lower hook 550 and an upper hook 590. In this case, lower hook 550 is a rigid member which includes a hook portion 552 and a hinge portion 554. Lower hook 550 may comprise a molded or thermoformed plastic hook or may be formed from a suitable sheet metal material such as aluminum, stainless steel, or the like. Lower hook 550 also includes a recess portion 560 which receives the carriage bolt 524 of a microphone stand adaptor 520 such as described above. Hook 590 is a molded hook with an integral tension member 570 which loops through hinge portion 554. In this case, tension member 270 comprises a shock cord material. Other resilient corded materials may be used as well.

Accordingly, the holding device has been described with some degree of particularity directed to the exemplary embodiments. It should be appreciated; however, that the present invention is defined by the following claims construed in light of the prior art so that modifications or changes may be made to the exemplary embodiments without departing from the inventive concepts contained herein.

What is claimed is:

1. A holding device for grasping a flat item, comprising:
   a hub having a front side for confronting the item and an opposite back side; and
   a plurality of grappling assemblies rotatably attached to said hub, each grappling assembly including:
      an elongated tension member having first and second end portions, said tension member extending around a thimble attached to said hub, and
      a hook sized and adapted to engage an edge of the item, said hook including a body portion and at least one arm extending therefrom, wherein said body portion includes a cavity with first and second open ends, said first and second end portions extending into said first open end and a jaw fitting extending into said second open end, said jaw fitting operative to grasp said first and second end portions.

2. A holding device according to claim 1, further comprising a bracket removably engaged with the back side of said hub.

3. A holding device according to claim 1, wherein each thimble comprises an arcuate channel extending around an aperture formed through each thimble.

4. A holding device according to claim 3, wherein each thimble is rotatably attached to said hub with a fastener extending through said hub and each aperture.

5. A holding device according to claim 1, wherein each said hook includes a pair of arms extending therefrom.

6. A holding device according to claim 5, wherein each arm extends laterally from said body portion and are joined together with an arcuate bridge portion.

7. A holding device according to claim 5, wherein said arm includes a right angle bend.

8. A holding device according to claim 5, further comprising a resilient pad disposed on said front side of said hub and an additional resilient pad disposed on each said body portion.

9. A holding device for grasping a flat item, comprising:
   a hub having a front side for confronting the item and an opposite back side;
   a plurality of elongated tensioning members rotatably attached to the back side of the hub, wherein each tensioning member has first and second end portions, each tensioning member extending around a fastener attached to the hub; and
   each tensioning member including a hook adapted to engage an edge of the item, said hook including a body portion and a pair of arms extending laterally therefrom, wherein said body portion includes a cavity with first and second open ends, said first and second end portions extending into said first open end and a jaw fitting extending into said second open end, said jaw fitting operative to grasp said first and second end portions.

10. A holding device according to claim 9, wherein each jaw fitting includes a pair of tangs each tang including at least one tooth for engaging a corresponding tensioning member.

* * * * *